(12) United States Patent
Choe et al.

(10) Patent No.: US 6,546,814 B1
(45) Date of Patent: Apr. 15, 2003

(54) METHOD AND APPARATUS FOR ESTIMATING TORQUE IN ROTATING MACHINERY

(75) Inventors: Howard C. Choe, Andover, MA (US); Jonathan M. Glesmann, Andover, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 09/268,104

(22) Filed: Mar. 13, 1999

(51) Int. Cl.⁷ .................................................. G01L 3/00

(52) U.S. Cl. ................................................ 73/862.08

(58) Field of Search ............................ 73/862.08, 117; 123/399, 339.11, 241

(56) References Cited

U.S. PATENT DOCUMENTS

| | | | |
|---|---|---|---|
| 3,187,303 A | | 6/1965 | Chiapuzio, Jr. et al. |
| 3,677,072 A | | 7/1972 | Weichbrodt et al. |
| 3,693,726 A | * | 9/1972 | Hornig et al. ............. 173/179 |
| 3,841,149 A | | 10/1974 | Edwin et al. |
| 3,913,084 A | | 10/1975 | Bollinger et al. |
| 3,969,941 A | | 7/1976 | Rapp |
| 4,054,786 A | | 10/1977 | Vincent |
| 4,074,575 A | | 2/1978 | Bergman et al. |
| 4,109,312 A | | 8/1978 | Beautel |
| 4,156,280 A | | 5/1979 | Griess |
| 4,165,458 A | | 8/1979 | Koizumi et al. |
| 4,209,779 A | | 6/1980 | Beck et al. |
| 4,211,113 A | | 7/1980 | Harrison |
| 4,217,926 A | | 8/1980 | Van Gorder |

(List continued on next page.)

FOREIGN PATENT DOCUMENTS

| | | |
|---|---|---|
| EP | 0 133 069 A1 | 2/1985 |
| EP | 0 373 010 A1 | 6/1990 |
| EP | 347165 | 11/1993 |
| EP | 0 718 608 A1 | 11/1995 |
| EP | 0 758 740 A2 | 8/1996 |
| EP | 0 791 810 A2 | 8/1997 |
| EP | 0797028 | 9/1997 |
| FR | 2 626 070 A1 | 7/1989 |
| GB | 2083595 | 3/1982 |
| JP | 10281446 | 10/1998 |
| WO | 84/04164 A1 | 10/1984 |
| WO | 90/07645 A1 | 7/1990 |
| WO | WO 96/13011 | 5/1996 |
| WO | WO 97/43729 | 11/1997 |
| WO | WO 98/36251 | 8/1998 |

OTHER PUBLICATIONS

International Search Report from International Application No. PCT/US00/06472.
International Search Report dated Sep. 1, 2000 for International application No. PCT/US 00/06193.
International Search Report dated Sep. 13, 2000 for International application No. PCT/US 00/06201.
D. Dyer, Detection of Rolling Element Bearing Damage by Statistical Vibration Analysis, Transactions of the ASME, Journal of Mechanical Design, pp. 1–7, 1977.
The Journal of the Institute of Electical Engineers of Japan, vol. 99, No. 3, Mar. 1979, with partial translation.

*Primary Examiner*—Max Noori
(74) *Attorney, Agent, or Firm*—Wolf, Greenfield & Sacks, P.C.

(57) ABSTRACT

Torque information of a rotating machine may be determined by counting a number of discrete samples representing a rotation of a rotating component. If the number of discrete samples representing the rotation of the rotating component changes, it may be assumed that the torque has changed due to a change in loading placed on the rotating machine. The amount of change in torque may be determined by determining the amount of change in the number of discrete samples representing the rotation of the rotating component.

7 Claims, 18 Drawing Sheets

U.S. PATENT DOCUMENTS

| | | |
|---|---|---|
| 4,270,041 A | 5/1981 | Playber |
| 4,302,813 A | 11/1981 | Kurihara et al. ............ 364/508 |
| 4,316,175 A | 2/1982 | Korber et al. |
| 4,340,886 A | 7/1982 | Boldt et al. |
| 4,352,293 A | 10/1982 | Kurihara et al. |
| 4,366,544 A | 12/1982 | Shima et al. |
| 4,409,832 A | 10/1983 | Konjedic et al. ............ 73/292 |
| 4,418,567 A | 12/1983 | Boning et al. ................. 73/35 |
| 4,429,578 A | 2/1984 | Darrel et al. |
| 4,437,163 A | 3/1984 | Kurihara et al. |
| 4,451,916 A | 5/1984 | Casper et al. |
| RE31,750 E | 11/1984 | Morrow |
| 4,510,547 A | 4/1985 | Rudich, Jr. |
| 4,518,268 A | 5/1985 | Swis et al. |
| 4,520,674 A | 6/1985 | Canada et al. |
| 4,525,700 A | 6/1985 | Kimura et al. ............. 340/518 |
| 4,528,852 A | 7/1985 | Sohoel |
| 4,530,240 A | 7/1985 | Board et al. |
| 4,550,591 A | 11/1985 | Cox et al. |
| 4,550,604 A | 11/1985 | Sugimoto et al. |
| 4,589,282 A | 5/1986 | Dumery ....................... 73/313 |
| 4,609,994 A | 9/1986 | Bassim et al. |
| 4,612,620 A | 9/1986 | Davis et al. |
| 4,627,282 A | 12/1986 | Fales ........................... 73/302 |
| 4,648,290 A | 3/1987 | Dunkley et al. |
| 4,683,542 A | 7/1987 | Taniguti |
| 4,707,796 A | 11/1987 | Calabro et al. |
| 4,758,964 A | 7/1988 | Bittner et al. |
| 4,800,512 A | 1/1989 | Busch |
| 4,831,558 A | 5/1989 | Shoup et al. |
| 4,835,717 A | 5/1989 | Michel et al. .............. 364/558 |
| 4,872,337 A | 10/1989 | Watts et al. |
| 4,873,702 A | 10/1989 | Chiu |
| 4,884,449 A | 12/1989 | Nishimoto et al. |
| 4,885,707 A | 12/1989 | Nichol et al. |
| 4,896,565 A * | 1/1990 | Simonyi et al. ............ 192/3.31 |
| 4,931,949 A | 6/1990 | Hernandez et al. |
| 4,972,332 A | 11/1990 | Luebbering et al. ........ 364/565 |
| 4,977,395 A | 12/1990 | Bozeman, Jr. |
| 4,977,516 A | 12/1990 | Shepard |
| 4,980,675 A | 12/1990 | Meisenheimer et al. |
| 4,980,844 A | 12/1990 | Demjanenko et al. |
| 4,985,857 A | 1/1991 | Bajpai et al. |
| 4,989,159 A | 1/1991 | Liszka et al. |
| 5,018,988 A | 5/1991 | Kibblewhite et al. ........ 439/577 |
| 5,050,427 A | 9/1991 | Cote et al. ................. 73/118.1 |
| 5,058,434 A | 10/1991 | Zaschel |
| 5,063,775 A | 11/1991 | Walker, Sr. et al. .......... 73/155 |
| 5,084,674 A | 1/1992 | Lachmann et al. .......... 324/174 |
| 5,099,715 A | 3/1992 | Baiker |
| 5,107,246 A | 4/1992 | Mogaki ....................... 340/449 |
| 5,109,610 A | 5/1992 | Johnson ....................... 33/559 |
| 5,112,196 A | 5/1992 | Schuh |
| 5,138,559 A | 8/1992 | Kuehl et al. ................ 364/509 |
| 5,144,915 A | 9/1992 | Grabs |
| 5,189,929 A | 3/1993 | Chory ........................... 74/606 |
| 5,210,704 A * | 5/1993 | Husseiny ................ 364/551.01 |
| 5,212,989 A | 5/1993 | Kodama et al. .............. 73/706 |
| 5,239,490 A * | 8/1993 | Masaki et al. ........... 73/862.08 |
| 5,249,138 A | 9/1993 | Piety, Jr. et al. |
| 5,251,151 A | 10/1993 | Demjanenko et al. |
| 5,282,386 A | 2/1994 | Niemczyk et al. ............ 73/292 |
| 5,293,196 A | 3/1994 | Kaneko et al. |
| 5,315,877 A | 5/1994 | Park et al. ..................... 73/724 |
| 5,315,972 A | 5/1994 | Judy et al. |
| 5,325,312 A | 6/1994 | Kidd |
| 5,394,341 A | 2/1995 | Kepner ..................... 364/551.1 |
| 5,407,265 A | 4/1995 | Hamidieh et al. |
| 5,433,525 A | 7/1995 | El-Ibiary |
| 5,442,961 A | 8/1995 | Bozeman, Jr. |
| 5,452,616 A * | 9/1995 | Leon et al. .............. 73/862.08 |
| 5,477,730 A | 12/1995 | Carter |
| 5,477,735 A | 12/1995 | Li |
| 5,483,222 A | 1/1996 | Tice ........................... 340/518 |
| 5,509,310 A | 4/1996 | El-Ibiary |
| 5,511,422 A | 4/1996 | Hernandez |
| 5,526,292 A | 6/1996 | Hodgson |
| 5,561,610 A | 10/1996 | Schricker et al. |
| 5,565,687 A | 10/1996 | Berrill ........................ 250/577 |
| 5,586,156 A | 12/1996 | Gaubatz |
| 5,587,931 A | 12/1996 | Jones et al. |
| 5,602,732 A | 2/1997 | Nichols et al. |
| 5,602,757 A | 2/1997 | Haseley et al. |
| 5,610,341 A | 3/1997 | Tortora ........................ 73/756 |
| 5,614,659 A | 3/1997 | Rickman ................... 73/35.16 |
| 5,621,176 A | 4/1997 | Nagano et al. ............... 73/174 |
| H1647 H | 5/1997 | Appleman |
| 5,633,800 A | 5/1997 | Bankert et al. |
| 5,635,646 A | 6/1997 | Eriksson ....................... 73/660 |
| 5,636,620 A | 6/1997 | Kiess et al. |
| 5,642,717 A | 7/1997 | Gilman et al. |
| 5,646,350 A | 7/1997 | Robinson et al. |
| 5,661,659 A | 8/1997 | Forecast et al. |
| 5,669,337 A | 9/1997 | Drouillard |
| 5,679,900 A | 10/1997 | Smulders |
| 5,686,669 A | 11/1997 | Hernandez |
| 5,691,904 A | 11/1997 | Lysen |
| 5,698,788 A | 12/1997 | Mol et al. |
| 5,718,822 A | 2/1998 | Richter ........................ 210/90 |
| 5,726,911 A | 3/1998 | Canada et al. |
| 5,744,723 A | 4/1998 | Piety |
| 5,760,310 A | 6/1998 | Rud, Jr. et al. ............... 73/706 |
| 5,789,665 A | 8/1998 | Voelker et al. ............. 73/53.05 |
| 5,792,949 A | 8/1998 | Hewelt et al. ............. 73/117.3 |
| 5,809,843 A | 9/1998 | Barger et al. .................. 74/574 |
| 5,826,208 A * | 10/1998 | Kuriowa et al. .............. 701/54 |
| 5,830,106 A | 11/1998 | Abe ............................. 477/98 |
| 5,844,501 A | 12/1998 | El-Ibiary |
| 5,845,236 A | 12/1998 | Jolly et al. |
| 5,895,857 A | 4/1999 | Robinson et al. |
| 5,941,792 A * | 8/1999 | Amendt et al. ................ 477/74 |
| 5,955,674 A | 9/1999 | McGovern et al. |
| 5,986,357 A | 11/1999 | Myron et al. |
| 5,995,910 A | 11/1999 | Discenzo |
| 6,003,379 A | 12/1999 | Ichikawa et al. |
| 6,014,604 A * | 1/2000 | Kuriowa et al. .............. 701/54 |
| 6,026,340 A | 2/2000 | Corrado et al. |
| 6,035,734 A | 3/2000 | LeVan |
| 6,082,737 A | 7/2000 | Williamson et al. |
| 6,089,097 A | 7/2000 | Frick et al. |
| 6,089,106 A | 7/2000 | Patel et al. |
| 6,112,423 A | 9/2000 | Sheehan |
| 6,113,515 A * | 9/2000 | Salecker et al. .......... 192/82 T |
| 6,138,078 A | 10/2000 | Canada et al. |
| 6,193,032 B1 | 2/2001 | Lesieutre et al. |
| 6,260,004 B1 | 7/2001 | Hays et al. |
| 6,272,411 B1 | 8/2001 | Corrado et al. |
| 6,308,138 B1 | 10/2001 | Jones et al. |
| 6,202,038 B1 | 3/2002 | Wegerich et al. |
| 6,358,186 B1 * | 3/2002 | Kosik et al. ................ 477/176 |
| 6,242,733 B1 | 6/2002 | Ma et al. |

* cited by examiner

| $H_T$ | ○ | ○ | ○ | ○ | ǀ | ǀ | ǀ | ǀ |
|---|---|---|---|---|---|---|---|---|
| $H_P$ | ○ | ○ | ǀ | ǀ | ○ | ○ | ǀ | ǀ |
| $H_V$ | ○ | ǀ | ○ | ǀ | ○ | ǀ | ○ | ǀ |
| | OFF | | | FAULTY TEMP. SENSOR | | FAULTY PRESSURE SENSOR | FAULTY PRESSURE SENSOR | ON |

Fig. 11

METHOD AND APPARATUS FOR ESTIMATING TORQUE IN ROTATING MACHINERY

BACKGROUND OF THE INVENTION

1. Field of the Invention

This invention relates to rotating machinery and more particularly to determining torque in rotating machinery.

2. Related Art

In the ever-increasing competition in the industrial field, industrial equipment, such as rotating machinery, must operate at or near full capacity and sustain such operation for long periods of time. With this type of demand placed on such equipment, periodic maintenance to avoid a catastrophic failure becomes important. Of course, periodic preventative maintenance requires that the equipment be taken off-line for service, thereby potentially resulting in unnecessary down time. Maintenance engineers have been challenged to establish proper time intervals for scheduled preventative maintenance in order to reduce such unnecessary down time.

Alternatively, some maintenance engineers have concluded that the equipment should operate until catastrophic failure. This stems from the fact that, in some instances, it may be better to operate equipment until it fails than to accept the maintenance and the resulting penalty costs of shutting down the equipment prematurely. Also in lieu of scheduled maintenance, some defects may be found by a trained operator. Because such detection is subject to human interpretation, pass/fail criteria may vary between operators and also from day to day with the same operator. Other defects may not be detected at all.

Attempts have been made to automatically monitor such equipment for defects through the use of a sensing element disposed within the equipment itself or through the use of a hand-held device which is periodically attached to one or more discrete locations on the machine being monitored. More sophisticated monitoring systems are permanently installed and carry out essentially continuous monitoring of a machine-mounted transducer along with computer-based analysis of all monitored data.

Most automatic monitoring systems typically sense vibration or temperature. Vibration is produced by the moving parts in the rotating machinery due to causes such as unbalance, misalignment of shafts, worn out bearings, broken gear teeth or foreign particles lodged within the machine. Excessive levels of vibration indicate malfunction of the machine, which can result in machine failure. The temperature of a bearing, for example, can also be monitored to detect the occurrence of over-heating. In some instances, the oil level in the machine may be monitored, automatically through the use of a float system or manually through the use of a dipstick or a sight glass, so that the likelihood of defects or malfunction of the device due to low oil level may be reduced. Other automatic means to detect oil level include beam techniques that measure time of flight or frequency modulation of an ultrasonic, microwave or light/laser beam. Electrical methods have also been employed that detect changes in current, voltage, capacitance or inductance of the liquid to determine the fluid level.

In addition to the above-mentioned parameters sensed by conventional monitoring systems, the torque applied to the shaft of the machine may also be sensed, which may indicate whether machine is being overloaded. Typically, this requires the use of expensive and complicated measurement devices, such as strain gauges, positioned at discrete points on the rotating shaft.

SUMMARY OF THE INVENTION

According to one aspect of the invention, torque information of a rotating machine may be determined by counting a number of discrete samples representing a rotation of a rotating component. If the number of discrete samples representing the rotation of the rotating component changes, it may be assumed that the torque has changed due to a change in loading placed on the rotating machine. The amount of change in torque may be determined by determining the amount of change in the number of discrete samples representing the rotation of the rotating component.

In one embodiment, a sensor to sense the rotation of the rotating component and an analog-to-digital converter communicating with the sensor are provided. The sensor is sampled with the analog-to-digital converter to generate the number of sample readings.

In another embodiment, a plurality of a number of sample readings between complete revolutions is counted and minimum, maximum and mean number of sample readings between complete revolutions are calculated. The torque is based on the mean number of sample readings between complete revolutions.

In yet another embodiment, the torque of another rotating component is determined by comparing the determined torque to an efficiency of the device.

In another embodiment the rotating component is an input shaft and the other rotating component is an output shaft.

In another aspect of the invention, the above method may be performed by an apparatus or a system.

Various embodiments of the present invention provide certain advantages and overcome certain drawbacks of the conventional techniques. Not all embodiments of the invention share the same advantages and those that do may not share them under all circumstances. Further features and advantages of the present invention, as well as the structure and operation of various embodiments of the present invention, are described in detail below with reference to the accompanying drawings.

BRIEF DESCRIPTION OF THE DRAWINGS

The invention will now be described, by way of example, with reference to the accompanying drawings, in which:

FIG. 11 is an example of a tabular output of the diagnostics performed in FIG. 10;

DETAILED DESCRIPTION

Figure 1:
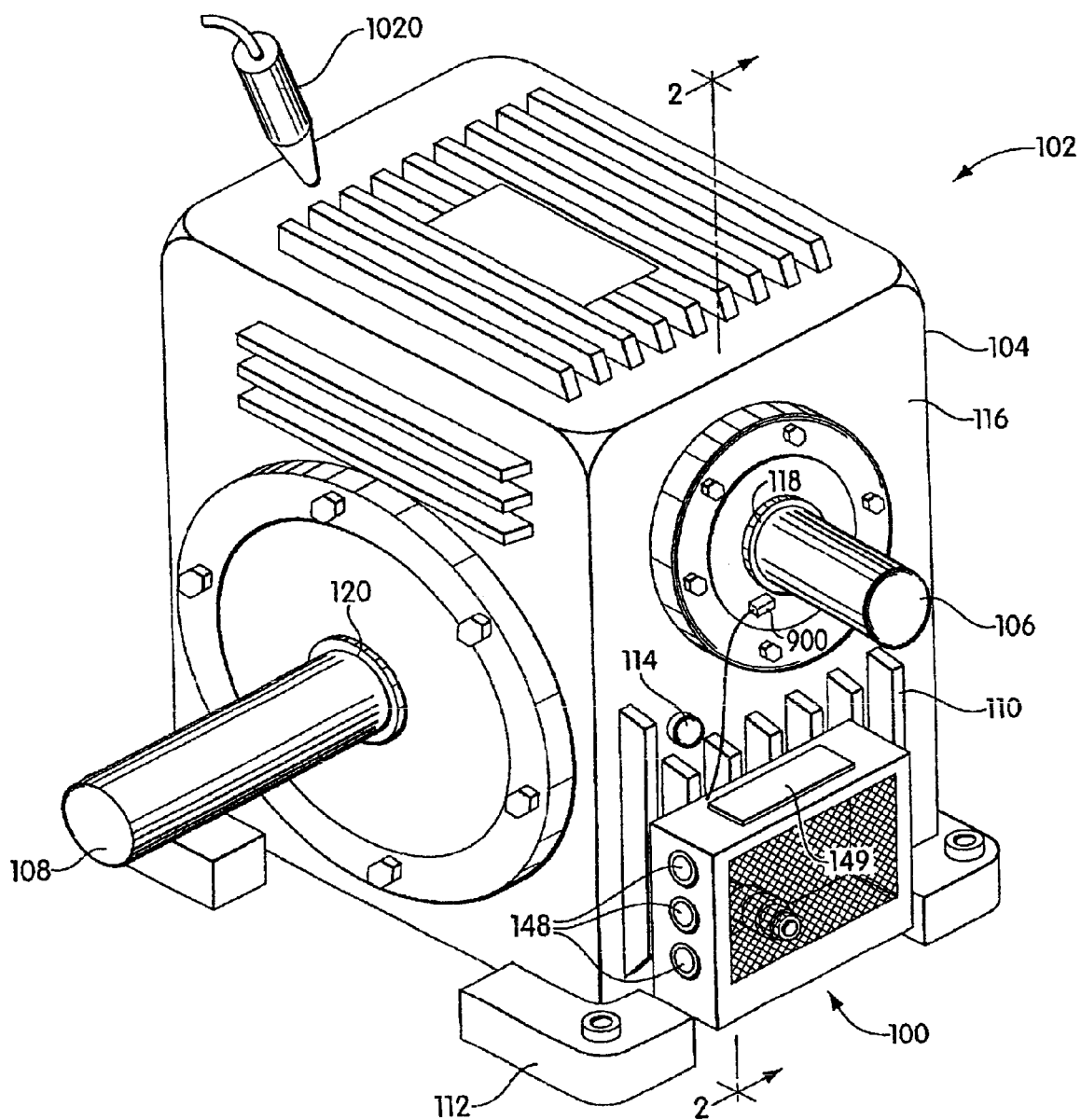
FIG. 1 is a perspective view of a device, such as a gearbox, for use with the present invention.
Figure 2A:
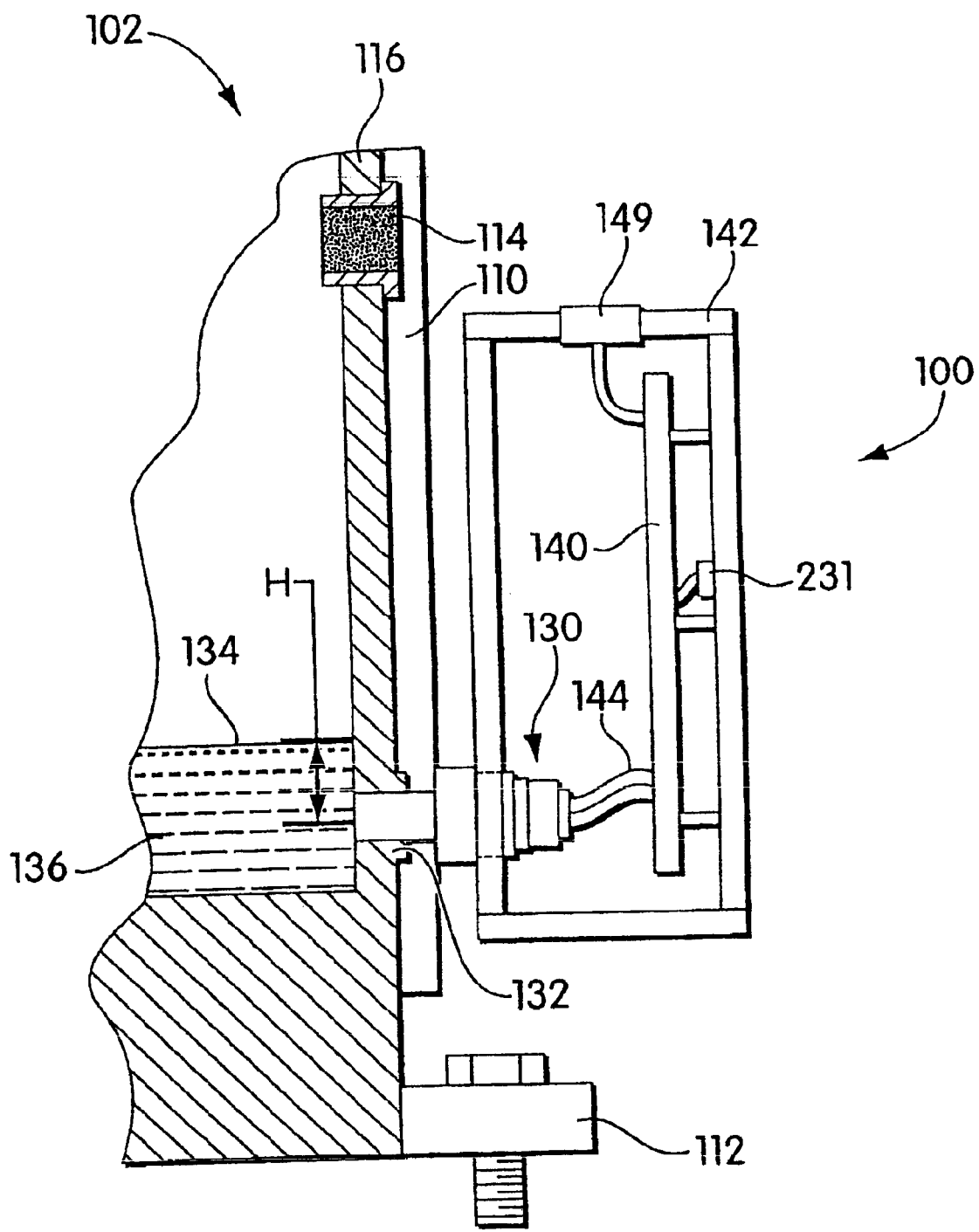
FIG. 2a is a cross-section taken along line 2—2 of FIG. 1 when the gearbox is in not operation.
Figure 2B:
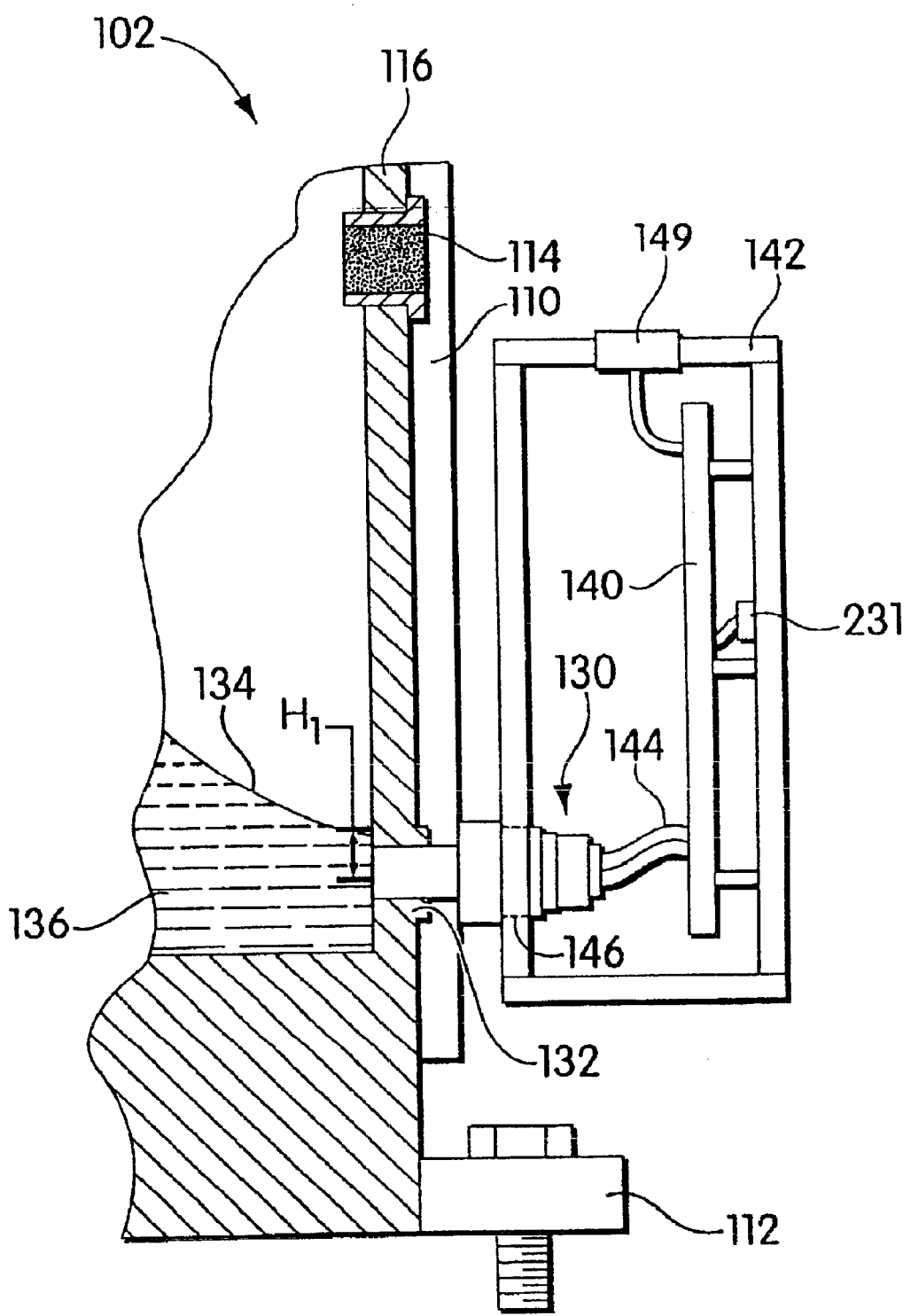
FIG. 2b is a cross-section taken along line 2—2 of FIG. 1 when the gearbox is in operation.

Referring now to FIG. 1, which is a perspective view of an example of a gearbox for use with the present invention, and FIGS. 2a and 2b, which are cross-sectional views of the portion of the gearbox taken along line 2—2 of FIG. 1 during inoperation and operation of the gearbox, respectively, a monitoring system 100 is shown attached to the gearbox 102. Although the invention described herein is discussed with particular reference to a gearbox, it is to be appreciated that any device or machine that is required to be monitored may be used with the system of the present invention.

The gearbox 102, which may be a conventional gearbox, includes a case 104 for encasing a speed reducing gear train (not shown). An input shaft 106 is connected to one side of the gear train and an output shaft 108 is connected to another side. Cooling fins 110 are formed on the case 104 of the gearbox 102 to allow for convective cooling. A plurality of mounting pads 112 may be used to secure the gearbox 102 in a suitable manner. The gearbox 102 may also include a breather element 114 formed through a side wall of the case 104 to prevent pressure buildup inside the gearbox 102. Such an increase in pressure may ultimately result in undesirable oil leakage past the shaft seals 118, 120.

Conventional gearboxes include at least one oil drain plug for draining oil contained therein and many gearboxes include more than one drain plug because the gearbox may be mounted in any desired orientation. Thus, in order to fully drain the oil from the gearbox, the drain plug should be below the oil level.

According to one aspect of the present invention, as best shown in FIGS. 2a and 2b, a sensor plug 130 may be adapted for attaching to an oil drain plug 132 of the gearbox 102 that is below the surface level 134 of the oil reservoir 136 at a predetermined depth "H". As will be fully explained hereinafter, a plurality of sensors for sensing operating conditions of the gearbox is located in the sensor plug 130.

When the gearbox is not operating (i.e. the input shaft 106 is not receiving power), the oil level 134 in the gearbox is a substantially flat, level surface and assumes a height designated as "H" relative to the sensor plug 130. However, as shown in FIG. 2b, when power is being delivered to the input shaft, the rotating geartrain within the gearbox causes the oil level 134 to deviate from a level surface and assume the shape of an angled surface, which may be a curved surface, as shown, a flat but inclined surface, or an irregularly perturbed surface. The amount of deviation may be a function of the characteristics of the oil as well as the speed of the gearbox. Other parameters, such as temperature, may also effect the amount of deviation. As a result, the height decreases to a level "$H_1$" relative to the sensor plug 130. Of course, the liquid level may rise, depending upon the direction of rotation of the geartrain as well as other parameters, such as internal restrictions, etc. Suffice it to say that the height is likely to change when the gearbox is powered. As used herein, the term "amount of deviation" shall mean the amount of increase or decrease in height of the oil level at a certain point on the liquid surface relative to the height of the oil level when the gearbox is not in operation.

The monitoring system 100 also includes a processing unit 140, typically implemented as a printed circuit board, mounted within a housing 142. The housing may be formed of any suitable material to withstand the operating environment of the gearbox. The processing unit 140 is electrically coupled to the plurality of sensors within the sensor plug 130 for receiving signals therefrom and for analyzing the signals to provide useful information as to the condition of the gearbox, as will be explained fully hereinafter. The housing 142 is preferably mounted directly to the sensor plug 130 and completely contains the electrical leads 144 of the plurality of sensors emerging from the sensor plug, thereby obviating the need for an external protected wire harness. A portion of the sensor plug extends into a hole 146 formed in the housing 142 and holds the housing 142 a distance away from the wall 116 of the gearbox so as to allow convective airflow between the housing and the cooling fins of the gearbox 102 for adequate cooling. The housing 142 may also include one or more connectors 148 (see FIG. 1), which are electrically connected to the processing unit 140, for communication with a network in which to relay one or more sensed operating conditions to a host computer. Each sensor may communicate independently with the network or the host computer through a dedicated communication link for that sensor. Power to the processing unit 140 and the sensors may be supplied through the network connectors 148.

Alternatively, the monitoring system 100 may function as a stand-alone unit in which the processing unit indicates the operating conditions of the gearbox through an indicator, for example, indicator 149. In one particular example, the indicator 149 may include one or more light-emitting diodes (LEDs) or a liquid crystal display (LCD) to indicate one or more status levels of the gearbox, such as "POWER ON", "NORMAL", "CAUTION" or "WARNING". Alternatively, the indicator may include a CRT displaying a graphical user interface (GUI) of the LCD may display the GUI.

Although not shown, rather than housing the processing unit in a separate housing that is mounted to the sensor plug, the processing unit may be housed within the sensor plug itself. In this example, the communications connectors would be disposed on the sensor plug.

Figure 3:
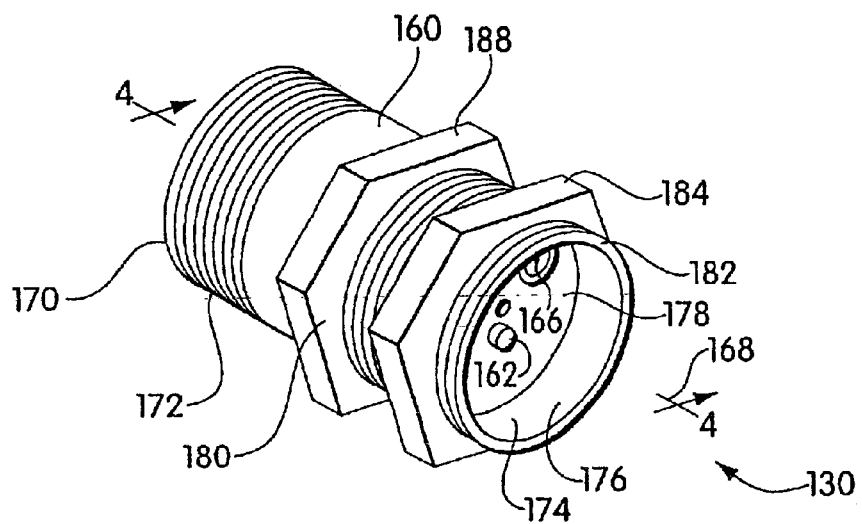
FIG. 3 is an enlarged perspective view of a sensor plug for use with the present invention.
Figure 4:
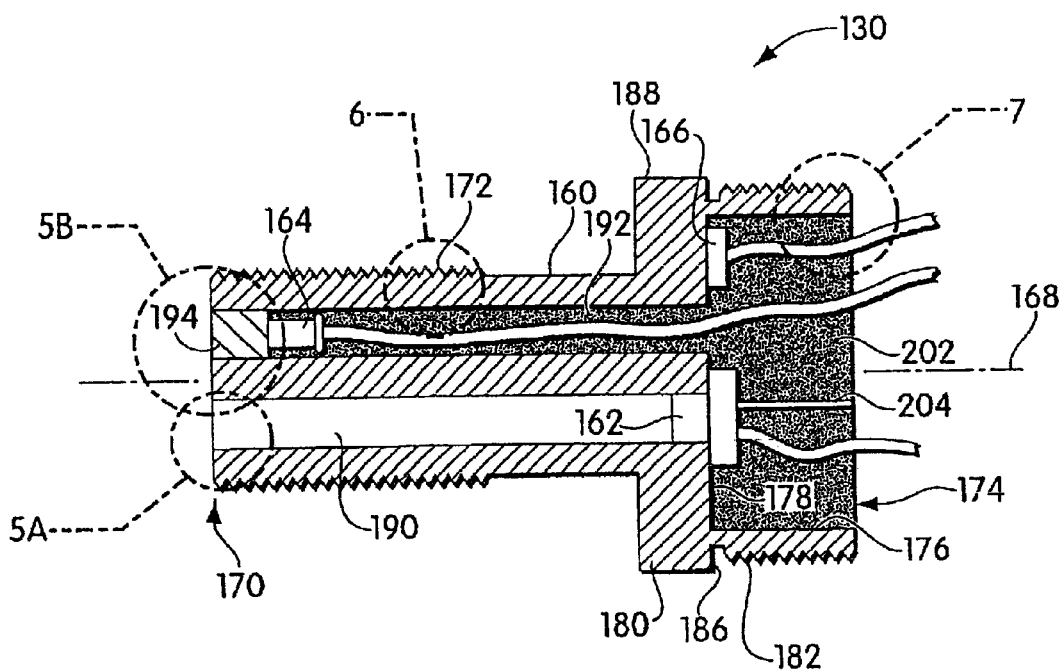
FIG. 4 is a cross-sectional view taken along line 4—4 of FIG. 3.

Referring now to FIG. 3, which is a perspective view of the sensor plug 130, and FIG. 4, which is a cross-sectional view of the sensor plug 130 taken along line 4—4 of FIG.

3, the sensor plug 130 includes a body 160 having one or more sensors housed therein for sensing operating conditions of the gearbox. In one particular example, the sensor plug 130 houses a pressure sensor 162, a temperature sensor 164 and a vibration (or noise) sensor 166, although it is to be appreciated that other sensors may be added or substituted.

The body 160 may be formed of any one or more suitable temperature resistant, rugged materials, such as plastic, metal or ceramic, in any suitable form, provided that the sensor plug may be readily attached to the gearbox. The sensor plug may also be fabricated using any suitable process such as molding, machining or casting. Preferably, the body 160 is formed of a plastic material having a generally longitudinally extending cylindrical shape defining a longitudinal axis 168. The sensor plug includes a probe end 170 at one end of the body 160, which is adapted for attaching to the gearbox, specifically to the oil drain plug 132 as previously mentioned. The probe end may be adapted such that it mounts flush with the interior wall of the case. A thread 172 may also be formed on the body at the probe end to facilitate attachment to the gearbox. This thread may be an N.P.T. thread to seal the sensor plug to the case or, alternatively, may be a straight thread with appropriate sealing means such as an O-ring or the like. In this particular example, the probe end is formed with a ¾ inch N.P.T. thread to match that of the oil drain plug. Adapting the sensor plug for attaching to the oil drain plug also readily facilitates quick removal and repair or replacement of any or all of the sensor(s) housed in the sensor plug or the sensor plug itself without undue complication.

The body 160 also includes a well 174 at another end of the body opposite the probe end 170 for containing one or more sensors. The well 174 may be defined by an axially extending sidewall 176 and a bottom wall 178 to shield the sensors. The body 160 further includes a shoulder 180 formed between the probe end 170 and the well 174. The shoulder 180 may be adapted to axially support the housing 142 such that the well 174 may pass through the hole 146 formed in the housing and extend into the housing 142 (see FIGS. 2a and 2b).

The well 174 may include a threaded section 182 formed on the outer surface thereof to receive a nut 184 in order to secure the housing 142 to the sensor plug 130. Of course, any suitable means for attaching the housing to the sensor plug may be employed. A groove 186 may also be formed between the shoulder 180 and the well 174 to receive either an O-ring or other sealing means such that the housing 142 may firmly seal onto the sensor plug 130.

As previously mentioned, the sensor plug 130 may house the processing unit 140. In this example, the well 174 may be adapted to receive the processing unit 140.

To facilitate attachment of the sensor plug 130 to the gearbox 102, the outer surface of the shoulder 180 may be formed with an installation tool surface 188. In a preferred embodiment, the outer surface is formed with flats, which may be in the form of a square or hex, to facilitate engagement with a wrench. It should be appreciated that the installation tool surface may be formed as any suitable surface in any suitable location in or on the body 160. For example, the installation tool surface may be formed of the probe end 170 or on the well 174. If formed on the well, the installation tool surface may be formed as any suitably shaped socket, such as a hex socket, a splined socket, a square socket, or the like. The sensor plug 130 may also be mounted to the gearbox through the use of a bonding agent such as a weld, solder or an epoxy, in addition to or instead of the threads.

Continuing with reference to FIG. 4, the sensor plug 130 may also include an axially extending pressure port 190 extending from the well 174 through to the probe end 170. The pressure sensor 162 communicates with the oil within the gearbox. Thus, the pressure sensor communicates with the pressure port 190. Those skilled in the art will recognize in view of this disclosure that the pressure sensor 162 may be mounted anywhere along the pressure port 190. Preferably, the pressure sensor 162 is mounted within the well 174 with any suitable epoxy or attachment means to sealingly secure the pressure sensor 162 to the pressure port 190.

In a preferred embodiment, the pressure sensor 162 is a piezoresistive sensor that can sense an oil pressure ("head") in a range from about 0.12 psi (for a relatively small gearbox) to about 1.86 psi (for a relatively large gearbox). Further, the pressure sensor should be able to detect a drop in oil pressure equivalent to about 1 inch (0.03 psi) when the gearbox is filled with an oil having a specific gravity of 0.849 (such as Mobil HC 634 Uptime oil). The pressure sensor should also be able to sense an increase in pressure of 0.1 psi above the oil pressure with a full oil reservoir (which is indicative of a clogged breather element). An example of such a pressure sensor capable of meeting the above mentioned requirements is item number CPC-C manufactured by Data Instruments, Inc. of Sunnyvale, Calif. U.S.A. The pressure sensor requires an excitation of 4 to 16 volts DC. The sensor produces a differential voltage output of 23 millivolts for one pound per square inch with a 15 volt DC stimulus. The interface electronics requires a differential input with voltage amplification and signal frequency cutoff above 10 hertz. A low pass filter may be used to increase noise voltage immunity.

Although not shown, a diaphragm may be mounted between the pressure sensor and the pressure port. Also, rather than provide a separate diaphragm, the pressure port may be formed as a blind hole having a thin wall section defining the transition between the pressure port and the well. The pressure sensor may then be mounted directly to this wall. In operation, this wall would act as a diaphragm and would also act as a seal between the pressure sensor and the pressure port. Of course, it is to be appreciated that producing a thin wall that would act as a diaphragm may only be practical when the sensor plug is formed of certain materials.

Figure 5A:
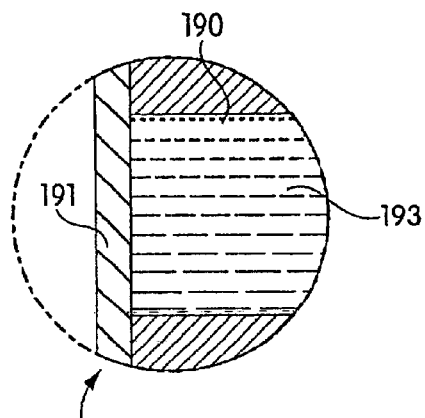
FIG. 5a is an enlarged view of an alternative embodiment of the area encircled by line 5a of FIG. 4.

In an alternative embodiment, as shown in FIG. 5a, a diaphragm 191 made of a suitable material may be placed over the pressure port at the probe end so that the diaphragm may be in contact with the oil in the gearbox when the sensor plug is attached to the gearbox. An incompressible liquid 193, such as oil, may be placed in the pressure port between the diaphragm 191 and the pressure sensor 162. In this manner, as the diaphragm deflects due to the oil pressure in the gearbox, the liquid pressure in the pressure port also increases, thereby triggering the pressure sensor. This embodiment may be advantageous because the sensor plug and the pressure sensor may thus be immune to sludge build-up in the oil reservoir of the gearbox.

As previously mentioned, a temperature sensor 164 may be included within the sensor plug 130 to detect the temperature within the gearbox. Specifically, the temperature sensor 164 may be used to sense temperature indicative of gear overheating or bearing overheating. Other temperature information may be used in various ways as desired, some of which will be described hereinafter. In one embodiment, the temperature information may be used to determine whether the gearbox is operating within its recommended temperature range, as supplied by the gearbox manufacturer. In another embodiment, the temperature information may be used to establish a rate of change of temperature, which may be used to indicate or predict various operating conditions.

In this example, the body 160 of the sensor plug 130 includes a temperature port 192 extending from the well 174 to the probe end 170. In the example shown in FIG. 4, the temperature port 192 extends through the body 160 to provide a thermally conductive path to the oil. A temperature port plug 194 may be inserted at the probe end of the temperature port so as to extend partially into the probe end to seal that end of the temperature port. Preferably, the temperature sensor 164 is disposed within the temperature port 192 and is used to detect the oil temperature within the gearbox. It is to be appreciated that the temperature port plug may finally rest at any suitable location along the temperature port so as to act as a seal between the oil reservoir of the gearbox and the temperature sensor. In one embodiment, the sensor plug is at least ⅛ inch long.

In a preferred embodiment, the temperature port plug 194 is formed of a thermally conductive material so that the temperature sensor 164 may readily determine the temperature of the oil and the gearbox. In addition, the temperature port plug 194 may be press-fit into the temperature port to seal the temperature port. Of course, those skilled in the art will recognize in view of the disclosure that other fastening means may be used, such as for example, the use of an epoxy or threads. Alternatively, any suitable seal, such as an epoxy seal, may be formed between the oil reservoir of the gearbox and the temperature sensor.

Figure 5B:
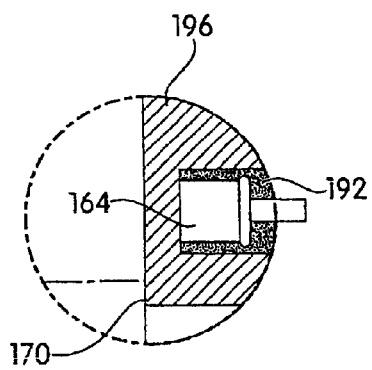
FIG. 5b is an enlarged view of an alternative embodiment of the area encircled by line 5b of FIG. 4.

In an alternative embodiment, as shown in. FIG. 5b, the temperature port 192 may be formed as a blind hole having an end wall 196 at the probe end 170 wherein the temperature port 192 does not extend completely through the body 160. In this example, however, the end of the temperature port may be formed of the same material as the body itself. In one embodiment, the end wall is at least ⅛ inch thick.

Figure 6:
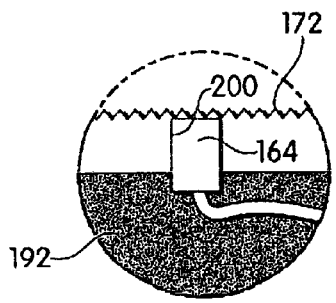
FIG. 6 is an enlarged view of an alternative embodiment of the area encircled by line 6 of FIG. 4.

Rather than sense the oil temperature, the sensor plug may be configured such that the temperature sensor is positioned to sense the temperature of the case of the gearbox. In such an example, as shown in FIG. 6, the sensor plug 130 may include a radially extending port 200 extending from the temperature port 192 through the threaded section 172. The temperature sensor 164 may be placed through the radial extending port 200 to readily sense the case temperature.

In a preferred embodiment, the temperature sensor 164 is a semiconductor sensor that is able to operate in a range between about −40° F. to about 200° F. with an accuracy of about +/−5° F. and with a response time of less than about 5 minutes. An example of such a temperature sensor capable of meeting the above mention requirements is item number LM35CZ-ND manufactured by the National Semiconductor Corporation of Santa Clara, Calif., U.S.A. This sensor requires a 4 to 30 volt DC stimulus and produces 10 millivolts per degree Celsius. An amplifier may be used to raise the voltage to a range that corresponds with the input range of an analog-to-digital converter. Due to the relatively large thermal masses involved, the signal of interest may be a slow varying DC level with frequency content up to a few hertz. The signal may be fed through a low pass filter with a cut off frequency of approximately 10 hertz in order to minimize the influence of noise (especially 60 hertz) in temperature measurements.

As previously mentioned, the sensor plug 130 may also include a vibration sensor 166, which (as best shown in FIG. 4) may comprise any suitable transducer and which may be disposed along any suitable surface within the well 174, such as the bottom wall 178 or the sidewall 176. Alternatively, the vibration sensor 166 may be mounted on an external surface of the body 160. Preferably, the vibration sensor is mounted to the bottom wall 178 of the well 174. Mounting at this location has the desirable effect of sensing horizontal vibration of the gearbox wall 116 when the sensor plug 130 is mounted thereto. Preferably, the vibration sensor is a piezoelectric accelerometer and should be able to detect a bearing frequency of about 300 Hz with a 6th harmonic frequency of about 1800 Hz and a gear frequency of about 500 Hz. An example of such a vibration sensor capable of meeting the above mentioned requirements is item number A5100-01 manufactured by Oceana Sensor Technologies, Inc. of Virginia Beach, Va., U.S.A. The sensor requires a voltage stimulus of 18 to 28 volts DC with a constant current source of 2 to 20 milliamps. The output of the sensor is 0.1 volt per g of acceleration. The signal conditioning for the accelerometer amplifies the voltage level in order for the analog-to-digital converter to be sensitive to the acceleration levels found in the vibration of a gearbox and its associated components. The accelerometer has a frequency response from 0.1 hertz up to 10,000 hertz. A low pass filter with a cutoff frequency of 10,000 hertz may be used to eliminate any aliasing of the signal when the signal is digitized at a rate above the Nyquist frequency of 20,000 hertz. It is to be appreciated that a noise sensor, such as a microphone or an ultrasonic transducer, may be used in place of the accelerometer.

In order to protect and secure the sensors within the sensor plug, a potting material 202, such as an epoxy, may be placed within both the well 174 and the temperature port 192, as shown in FIG. 4. It may be desirable that the pressure sensor 162 be exposed to both the pressure in the gearbox as well as to ambient pressure. To achieve this result when a potting material is used, an ambient pressure port 204 may be formed in the potting material 202. This may be accomplished by any suitable method including drilling a hole after the potting material is placed in the well, or alternatively, placing a tube adjacent the pressure sensor as the potting material is poured into the well.

Figure 7:
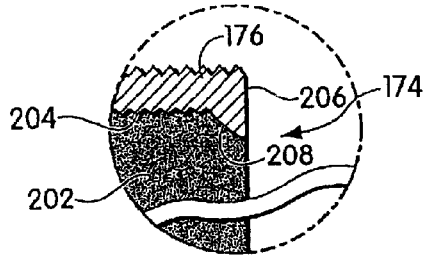
FIG. 7 is an enlarged view of an alternative embodiment of the area encircled by line 7 of FIG. 4.

To effectively hold the potting material 202 within the well, a retainer may be provided. In one particular example, the retainer is formed in the body itself. For example, as shown in FIG. 7, the sidewall 176 of the well 174 is provided with a coarse surface 204, such as a knurled surface. Thus, the potting material 202 may effectively attach to the sidewall 176, thereby reducing the likelihood that the potting material will dislodge from the well 174. Alternatively, also shown in FIG. 7, the outer end 206 of the well 174 may be formed with a radially inwardly extending lip 208. Once the potting material 202 is placed in the well 174, flows under the lip 208 and hardens, it may be effectively retained therein.

Further, although not shown, other retainers may be used. One such retainer may be in the form of a cap secured over the well 174 onto threads 182. Alternatively, the retainer may be formed as a plug which engages the sidewall 176. Those skilled in the art will recognize other retainers suitable for retaining the potting material in the well.

Figure 8:
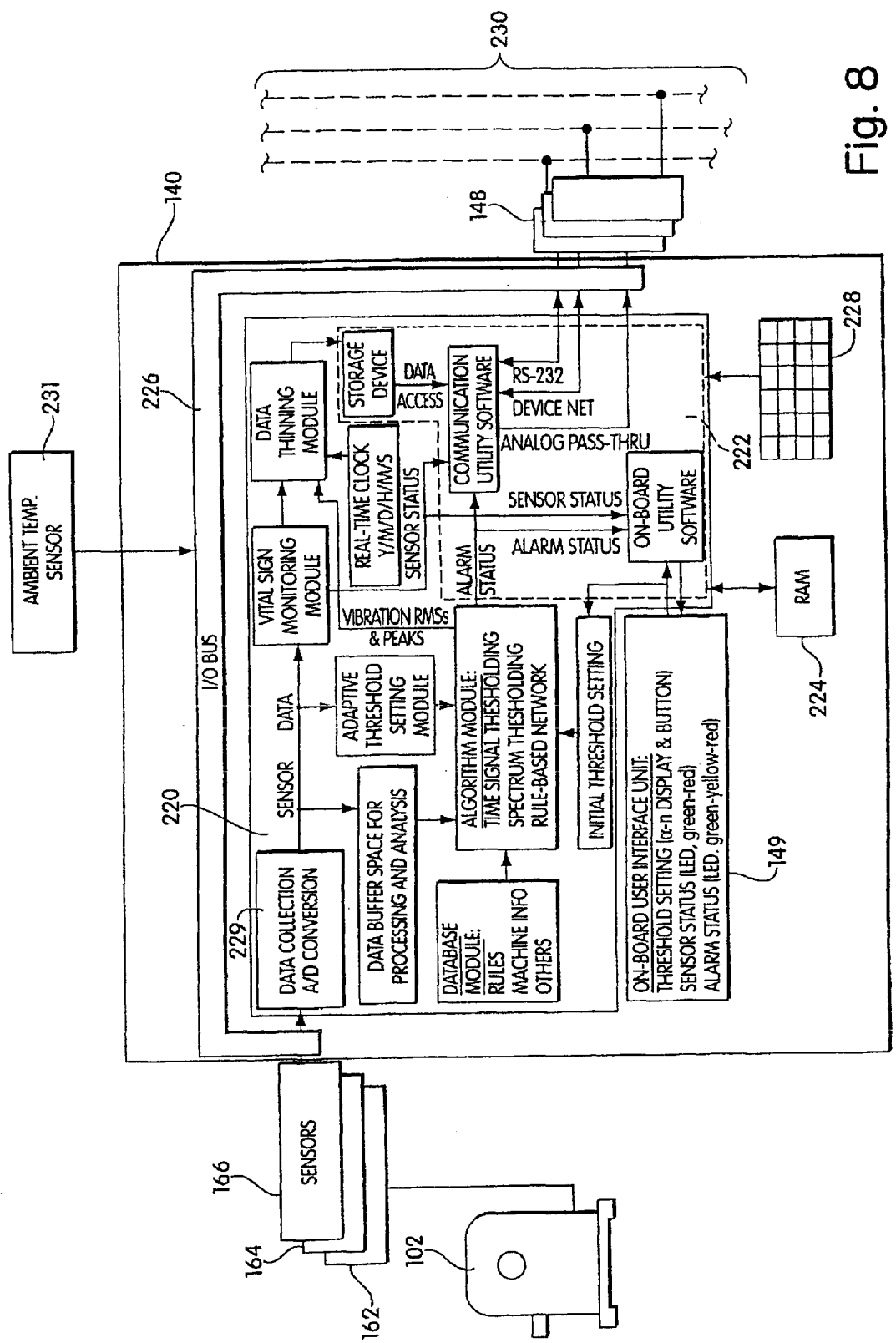
FIG. 8 is a diagrammatic representation of an example of a processing unit for use with the present invention.

Turning now to FIG. 8, a diagrammatic representation of the processing unit 140 of the system 100 coupled to the sensors and the gearbox is shown. It is to be appreciated that the system 100 may be embodied in a stand-alone unit in which case, the system program may be programmed into processing unit 140, as shown in FIG. 8, or may be embodied in a remote host computer (not shown), in which case, the system program may be programmed onto a hard-drive or other magnetic or optical medium. Of course, the processing unit may communicate with a storage medium such as a magnetic or optical medium, which may be programmed with the system program. In the example shown, the processing unit 140 includes a CPU 220, ROM 222, RAM 224 as well as an I/O bus 226, which may have 111 general purpose I/O lines. In addition to various computer codes that may make up the system, the ROM 222 may also include a look-up table 228. In a preferred embodiment, the table 228 may include temperature as a function of density for a given oil contained in the gearbox, which may be necessary for a certain computation as will be discussed hereinafter.

The sensors 162, 164, 166 are coupled to the processing unit 140 via I/O bus 226. The sensor signals may be passed through a filter, which may be a low pass filter, to an analog-to-digital converter 229 before being processed by the CPU 220. The CPU may have a 16 bit architecture with a 20 megahertz clock rate. The CPU may also communicate with a storage device to store historical data of sensed and/or determined operating conditions. An example of a suitable CPU is item number SAB-C167CR-LM manufactured by the Siemens Corporation of Germany. The analog-to-digital converter has a resolution 12 bits. The processing unit may include a CAN interface, two RS-232 ports, watchdog timer, and 5 timers. ROM memory may be used to download executable code to FLASH type memory and EEPROM type memory to store variables utilized by the executable code. The FLASH type memory may also used for long term data history storage. The analog-to-digital converter, the band pass filter and any other necessary components between the sensor and the CPU, together with the interconnecting signal lines define a sensor circuit.

As previously mentioned, the processing unit may communicate with a network 230 through connectors 148. In a preferred embodiment, the processing unit may communicate with the host computer via the RS-232 serial port and may operate autonomously with simple discrete logic output for alarming and/or analog communication via a 4–20 milliamp current loop. Alternatively, the processing unit may communicate through one or more fieldbus networks in order to accommodate modem production facilities with installed fieldbus networks. Examples of such a fieldbus network is a DeviceNet network, provided by the ODVA Organization of Coral Springs, Fla., U.S.A. or a Profibus network provided by the Siemens Corporation of Karlsruhe, Germany. These fieldbuses enable data exchange between intelligent devices distributed over a plant floor.

It is to be appreciated that the processing unit performs a plurality of functions, some of which may require comparisons between sensed values and thresholds and determinations based on whether the sensed values have exceeded or crossed the thresholds. Thus, as used herein, the terms "exceeded", "crossed", "greater than" or "less than" or any other term used to describe relative value are used interchangeably to mean that the sensed value has increased above a threshold value or that the sensed value has decreased below a threshold value, depending upon the polarities of the threshold value and the sensed value being compared and whether the sensed value is expected to increase or decrease.

In a preferred embodiment, an ambient temperature sensor 231 is coupled to the processing unit and is housed in the housing 142, preferably at a location away from the gearbox 102 and preferably on the outer housing wall, as shown in FIGS. 2*a* and 2*b*. An example of an ambient temperature sensor is item number LM35CZ-ND manufactured by the National Semiconductor Corporation of Santa Clara, Calif., U.S.A. In some embodiments, the processing unit receives both the ambient temperature from the ambient temperature sensor 231 and the oil temperature or the gearbox case temperature from temperature sensor 164 to derive a differential temperature, which may be compared to prescribed ranges as determined by the gearbox manufacturer.

Figure 9:
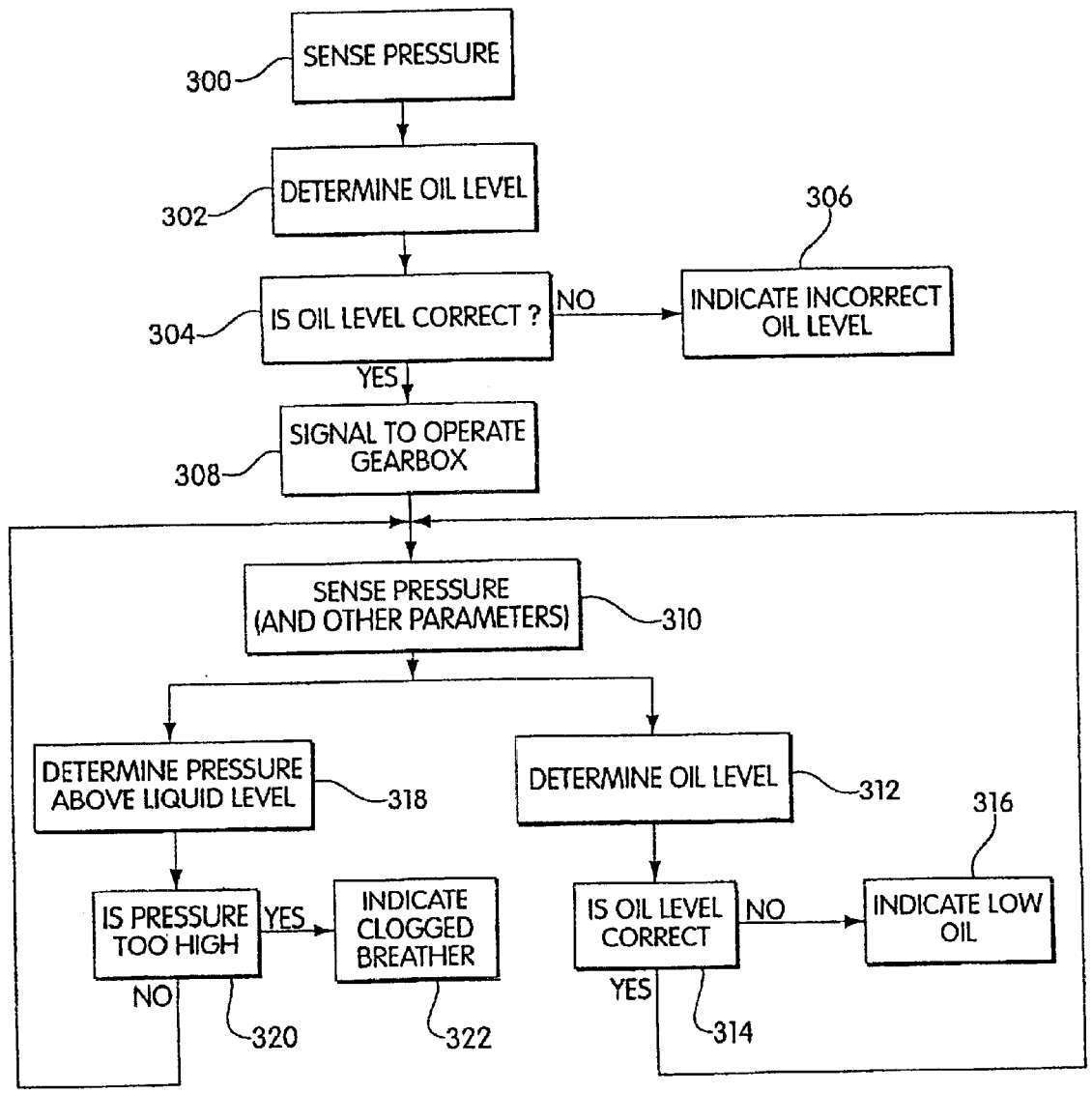
FIG. 9 is a flow chart showing an example of pressure sensor analysis.

In another aspect of the invention, the processing unit 140 may be pre-programmed with a set of instructions for carrying out at least some of the steps shown in FIG. 9. Initially, when the gearbox is not receiving power, at step 300, the oil pressure is sensed. It also is to be appreciated that, although the example described herein discloses an oil pressure sensor housed within a sensor plug, according to this aspect of the invention, the oil pressure sensor may be placed in any suitable housing, or no housing at all, provided that the oil pressure sensor can sense static oil pressure ("head") within the gearbox. At step 302, the oil level is determined based on the oil pressure. Oil level monitoring may be performed to detect oil loss due to a variety of reasons.

The oil level may be determined using the following equation:

$$P = \rho g H + P_A \quad [1]$$

where,

P=Sensed pressure

ρ=Density of the oil at a certain temperature;

g=Gravitational constant;

H=Height from the level of the pressure sensor to the surface of the oil; and, $P_A$=Pressure above the oil level (e.g., atmospheric pressure)

Thus, $$H = (P - P_A)/(\rho g) \quad [2]$$

With the oil temperature known, either through sensed temperature from temperature sensor 164, through an inferred temperature or through an assumed temperature stored in memory (i.e., ambient temperature), using the temperature density table 228 stored in ROM 222, the density may be readily determined. Given that the density and gravitational constant are known, that the pressure (P) is sensed and that the pressure above the oil level ($P_A$) may be assumed to be atmospheric, the height of the liquid level may be readily calculated using, for example, Equation [2]. Alternatively, a table of oil level as a function of oil pressure may be stored in ROM 222. The table may be compiled using the density of the oil (ρ) at a predetermined or assumed temperature. Also, a number of look-up tables may be provided, each based on a different oil density.

It should be appreciated that the pressure sensor 162 used in the example described herein is a differential pressure sensor because the sensor senses atmospheric pressure through ambient pressure port 204. Thus, pressure sensor 162 actually senses (P–$P_A$) and a direct measurement or assumption of $P_A$ is not required. Of course, an absolute pressure sensor may be used, in which case, atmospheric pressure may be sensed with another pressure sensor or an assumed atmospheric pressure ($P_A$) may be stored in ROM 222. The processing unit then calculates (P–$P_A$). The determined oil level may be indicated through, for example, indicator 149. Also, the oil level may be stored in memory to provide a history of the oil level. Thus, a rate of change in oil level may be indicated and used for predictive analysis, for example, by indicating when to add to or change the oil. In addition, a drop in oil pressure (i.e. a drop or absence of a signal from the pressure sensor) may be indicative of sludge build-up in the pressure port 190.

Rather than indicate the actual oil level, the processing unit may indicate whether the oil level is below a certain level. Thus, at step 304, the calculated oil level obtained in step 302 is compared with a stored threshold level. If the calculated oil level is different from the threshold, then, at step 306, the processing unit 140 indicates an incorrect oil level signal. It is to be appreciated that the method of the present invention described herein may detect a low oil level or a high oil level. In addition, it is to be appreciated that the threshold level may include some amount of tolerance, or bandwidth, in which a correct oil level may be indicated. Those skilled in the art will recognize in view of this disclosure that rather than rigorously perform the calculation of the actual oil level, the sensed pressure (P) may be compared directly to a desired threshold pressure ($P_D$), which may be calculated based on a desired threshold oil level ($H_D$).

If the oil level is correct, at step 308, the processing unit may signal that the gearbox is ready for operation. However, in a preferred embodiment, the absence of a warning suffices as an indication that the gearbox may be operated. During operation, as indicated at step 310, the processing unit 140, through the sensor 162, continues to monitor oil pressure. Also, the processing unit may continue to monitor other parameters, such as temperature, through sensor 164, and vibration, through sensor 166. Again, using either Equation [1] or Equation [2] or a look-up table, the oil level is determined at step 312.

At step 314, the oil level is compared to a threshold value. Because the gearbox is in operation and, as previously mentioned, the amount of deviation of the oil level may be a function of one or more gearbox operating states, such as speed or temperature for example, the threshold level may be adjusted to one or more new threshold values. Each new threshold value represents a desired oil level at a particular speed and/or temperature, for example. These new threshold values may be represented as discrete values or may be represented as a continuous function, and may be stored in the memory of the processing unit accordingly (i.e., as a look-up table or as an equation). Of course, each new threshold value may include some amount of tolerance, or bandwidth. If the determined oil level is different from the threshold, then, at step 316, the processing unit 140 generates an incorrect oil level indication.

It is to be appreciated that any suitable method to determine the speed of the gearbox may be used to determine the amount of deviation of oil level when the gearbox is in use. One such example is through the use of a speed sensor 900 (see FIG. 1) to sense any rotating component within the gearbox. Alternatively, the speed may be extrapolated from information derived from the vibration sensor.

It has been found, however, that it may not be necessary to adjust the second threshold based upon the speed of the gearbox. During operation of the gearbox at its rated capacity, the amount of deviation of oil level may be insignificant, especially in relatively large gearboxes. Thus, the tolerance or bandwidth of an acceptable oil level may be large enough to accommodate the relatively small amount of deviation in oil level.

The processing unit 140 used in the present invention may also detect whether the breather element 114 (see FIG. 1) is clogged. When the breather element is clogged, the pressure in the gearbox above the oil undesirably increases which may result in oil leakage past the shaft seal. The pressure increase may be primarily due to the increasing temperature in the gearbox, which may occur during operation.

Thus, continuing with reference to FIG. 9, at step 318, the processing unit 140 determines the pressure above the oil by sensing the oil pressure (P) and subtracting the desired pressure ($P_D$), (which is the oil pressure when the oil level is at the threshold value) to obtain a calculated pressure ($P_C$). This calculated pressure ($P_C$) is compared with atmospheric pressure ($P_A$) at step 320 to determine whether the sensed pressure is too high. If the calculated pressure ($P_C$) is greater than atmospheric pressure ($P_A$), then, at step 322, the processing unit 140 indicates that the breather element 114 is clogged.

It should be appreciated that because the pressure sensor 162 used in the example described herein is a differential pressure sensor, rather than subtracting the atmospheric pressure ($P_A$), a direct comparison may be made between the sensed pressure (P) and the desired pressure ($P_D$). If the sensed pressure (P) is greater than the desired pressure ($P_D$), a clogged breather element may be indicated.

In another aspect of the invention, the processing unit 140 may indicate when to change the oil in the gearbox. This may be accomplished by determining the amount of time that the gearbox has been operating since the previous oil change.

Figure 10:
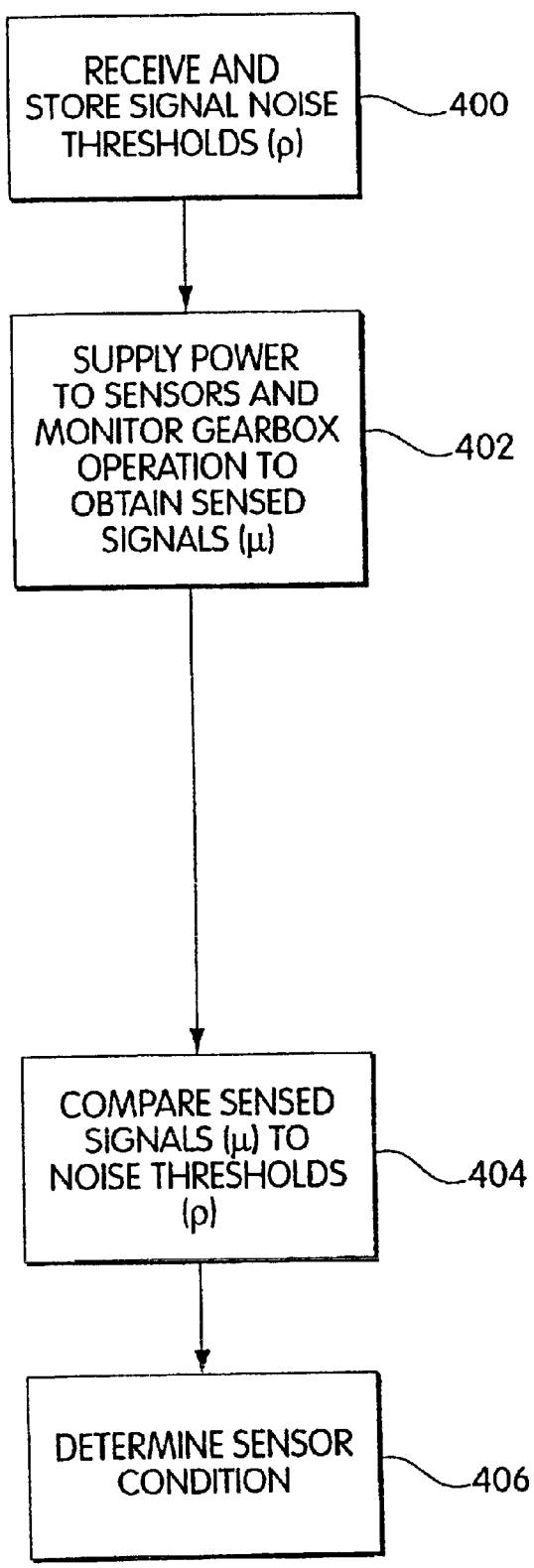
FIG. 10 is a flow chart showing an example of sensor diagnostics.

According to yet another aspect of the invention, in some instances, it may be desirable to determine whether a sensor is malfunctioning. Otherwise, it is possible that a false indication of gearbox malfunction may be made, or the system may fail to detect a malfunction. In order to determine whether the sensors are operating properly, the system 100, through the processing unit 140, for example, performs a self-diagnostic test as exemplified in the steps shown in FIG. 10. Initially, during one operating state when the sensors are de-energized but the processing unit is energized, at step 400, a signal noise level threshold ($\rho$) is received by the processing unit and is stored in memory. The signal noise level threshold ($\rho$) represents the sensor noise itself as well as the sensor channel noise, which represents the noise between the sensor and the CPU. Rather than receive the signal noise level threshold ($\rho$), the signal noise level threshold ($\rho$) may be pre-set and stored in memory. This may be possible because the sensor noise level threshold may be known for the sensors and the sensor channel noise may be determined during manufacture of the processing unit.

At step 402, in another operating state, the sensors are energized and the gearbox operation is monitored. The sensor signals may be continuously monitored or may be periodically sampled to produce a sensed signal ($\mu$). At step 404, the sensed signal ($\mu$) is compared to the respective noise level ($\rho$) generated in step 400. Using the following set of Rules, a sensor status value (H) may be generated.

$$H_T=0, \text{ when } \mu_T \leq \rho_T \quad [3]$$

$$H_T=1, \text{ when } \mu_T > \rho_T \quad [4]$$

where, $H_T$=Temperature sensor status;

$\mu_T$=Sensed temperature;

$\rho_T$=Temperature signal noise;

0=Sensor is malfunctioning; and,

1=Sensor is functioning.

$$H_P=0, \text{ when } \mu_P \leq \rho_P \quad [5]$$

$$H_P=1, \text{ when } \mu_P > \rho_P \quad [6]$$

where,

H$_P$=Pressure sensor status;
$\mu_P$=Sensed pressure;
$\rho_P$=Pressure signal noise;
0=Sensor is malfunctioning; and,
1=Sensor is functioning.

$$H_V=0, \text{ when } \mu_V \leq \rho_V \qquad [7]$$

$$H_V=1, \text{ when } \mu_V > \rho_V \qquad [8]$$

where,

H$_V$=Vibration sensor status;
$\mu_V$=Sensed vibration;
$\rho_V$=Vibration signal noise;
0=Sensor is malfunctioning; and,
1=Sensor is functioning.

At step 406, a determination is made as to whether any sensor is faulty and, if so, which one. This may be accomplished, for example, by comparing a sensor status value of one sensor with the sensor status value of another sensor to determine a malfunctioning sensor.

The possible combinations of sensor status values are depicted in FIG. 11. Thus, for example, if the temperature sensor status (H$_T$) has a value of 0, indicating that the sensed temperature is less than the noise level (i.e., the temperature sensor is malfunctioning), and the pressure sensor status (H$_P$) has a value of 1, indicating that the sensed pressure is greater than a noise level (i.e., the pressure sensor is functioning properly), and the vibration sensor (H$_V$) status also has a value of 1, indicating that the sensed vibration is greater than a noise level (i.e., the vibration sensor is functioning properly), then the processing unit is able to determine that the temperature sensor is faulty because it returned a sensor status value different from the sensor status value of the other two sensors. Of course, the matrix of FIG. 111 may be larger or smaller, depending upon the number of sensors used.

Similarly, if H$_T$=1 and H$_V$=1, but H$_P$=0, then it can be assumed that the pressure sensor is faulty. The same analysis holds with respect to the vibration sensor. Thus, if H$_T$=1 and H$_P$=1, but H$_V$=0, then the vibration sensor is deemed faulty. Of course, if H$_T$=1, H$_P$=1, and H$_V$=1, then an indication of normal operation may be provided, or, preferably, no indication is provided. Also, if H$_T$=0, H$_P$=0 and H$_V$=0, then the processing unit is able to determine with a fair amount of certainty that the sensors are functioning properly but that the sensors are de-energized. The level of certainty rises because the probability of all three sensors simultaneously malfunctioning is low.

There are three situations where it becomes more difficult to detect which sensor, if any, may be malfunctioning. This occurs when two of the sensors status values (H) each indicate a value of 0 and the other indicates a value of 1. In this situation, processing unit 140 may use statistical analysis to determine whether or not one or both of the indicated sensors is malfunctioning. An example of such statistical analysis may include a mean-time-to-failure analysis for a certain sensor. Thus, if, for example, H$_V$=0 and H$_T$=0, yet H$_P$=1, then the mean-time-to-failure of the temperature sensor and the mean-time-to-failure of the vibration sensor are separately determined, and each is compared with its running time. If either of the sensors have operated beyond a mean time to failure, then an indication of sensor failure of that particular sensor may be made. Another example of a statistical analysis may be a statistical trending analysis in which the failure of a sensor may be based upon historical data accumulated in the memory of the processing unit. Of course, other suitable analysis methods may be used.

It should be appreciated that the sensed parameter ($\mu$), whether it be temperature, pressure or vibration, may be based on an average of a plurality of samples. In a preferred embodiment, 100 or more samples are recorded to determine an average value for ($\mu$). It should also be appreciated that the noise level thresholds ($\rho$) may include a range of values indicative of an acceptable range of normal operating conditions.

The processing unit may also determine whether any one of the sensors is in an open or short circuit condition. If the sensor is in a short circuit condition, the sensed signal ($\mu$) may be at a maximum value, which would indicate that the sensed condition is uncharacteristically high. The probability of such an occurrence is typically low, thus, it is reasonable to conclude that the sensor is in a short circuit condition. Similarly, if the sensed signal ($\mu$) is at a minimum value, then the sensor may be deemed to be in an open circuit condition because the sensed value would be uncharacteristically low. Of course, the opposite may be true (a short circuit may provide a minimum value for the sensed signal ($\mu$) and an open circuit may provide a maximum value for the sensed signal ($\mu$)), depending upon the polarity of the sensors as installed or the configuration of the processing unit.

Once it is determined that one or more sensors have failed, these sensors may be replaced easily and quickly. Alternatively, the entire sensor plug may be replaced with a new sensor plug having a new set of sensors.

Figure 12:
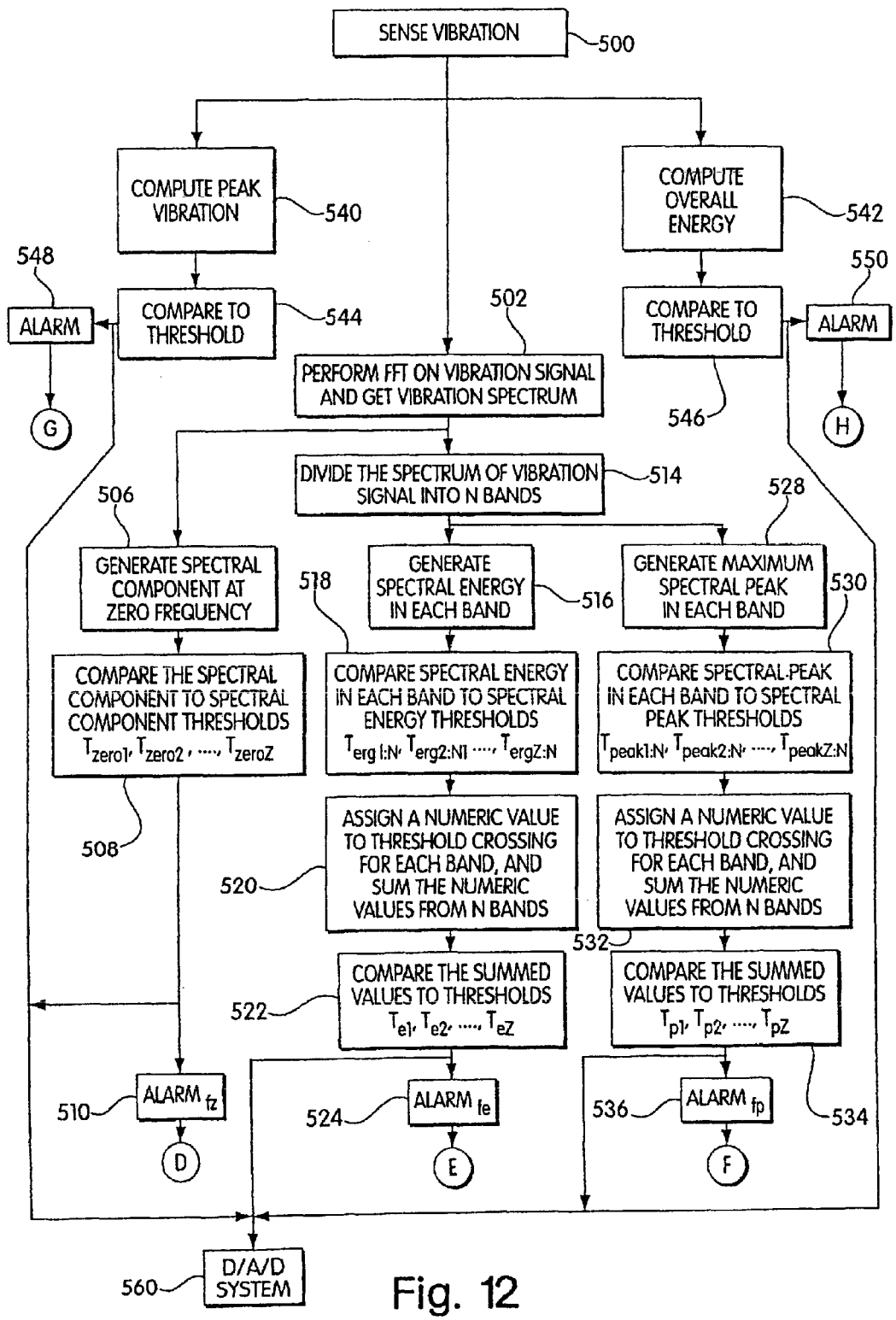
FIG. 12 is a flow chart showing an example of vibration sensor analysis.
Figure 13:
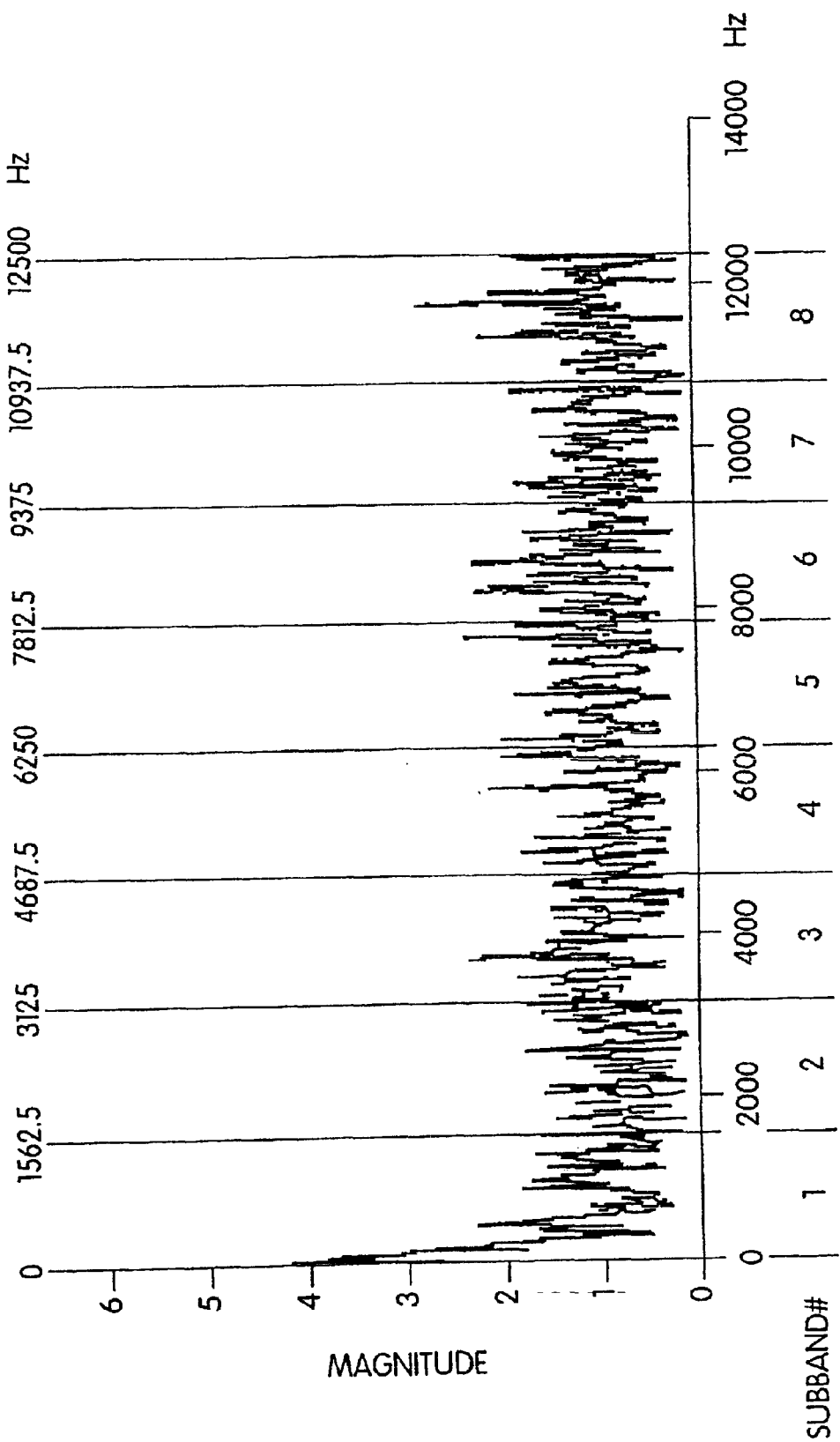
FIG. 13 is a frequency response diagram showing an example of an output of a vibration sensor.
Figure 14:
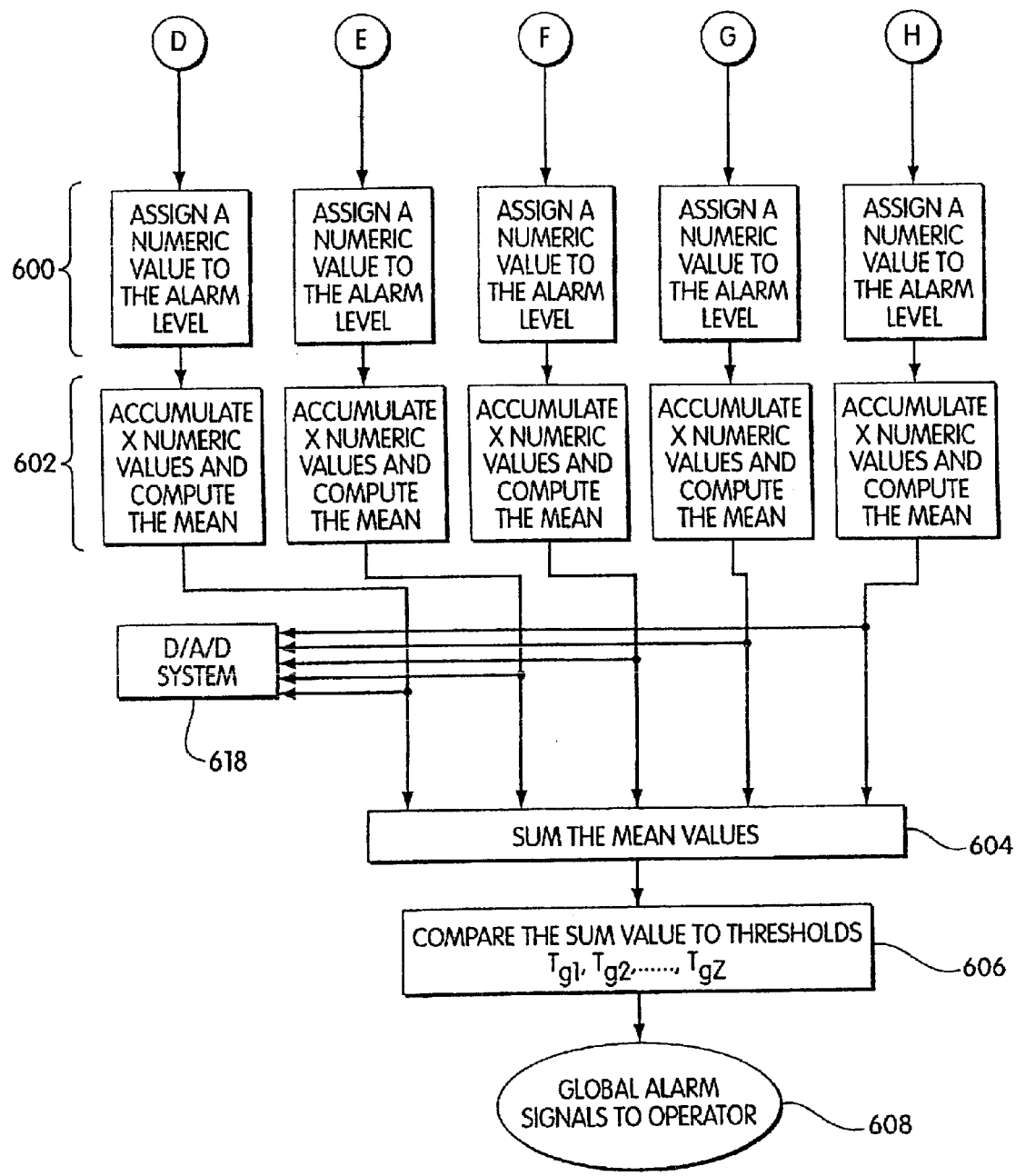
FIG. 14 is a flow chart showing an example of false alarm control for vibration.

The processing unit 140 may be pre-programmed with a set of instructions for analyzing the vibration signals from the vibration sensor 166. According to one aspect, the vibration analysis method disclosed herein is capable of determining the overall state or condition of the gearbox. According to another aspect, the vibration analysis method disclosed herein is capable of determining discrete component failures occurring within the gearbox. Referring now to FIGS. 12–14, and in particular to FIG. 12, at step 500, the processing unit 140 receives the vibration signal ($\mu_V$) from the vibration sensor 166, which represents the vibration of the gearbox. The sensed signal ($\mu_V$) is in the time domain and may be denoted as ($\mu_V(t)$), which may be analyzed within the time domain as will be discussed hereinafter. Next, at step 502, the processing unit 140 performs a Fourier Transform, which, may be a Fast Fourier Transform, on the debiased and debiased-rectified vibration signal to obtain a vibration spectrum in the frequency domain, as follows:

$$Y_{vh}(f)=Re\{Y_{vh}(f)\}+j\,Im\{Y_{vh}(f)\}=FT\{\mu_{Vd}(t)\} \text{ and } FT\{|\mu_{Vd}(t)|\} \qquad [9]$$

where,

FT=Fourier transform $Y_{vh}(f)$=the Fourier transform of $\mu_V(t)$ and is complex-valued $\mu_{Vd}(t)$=debiased or dc-removed vibration signal in time, and $|\mu_{Vd}(t)|$=debiased-rectified vibration signal in time.

For the spectrum generation, the magnitude of $Y_{vh}(f)$ is generated by:

$$Y_{vh\text{-}abs}(f)=|Y_{vh}(f)|=\sqrt{Re\{Y_{vh}(f)\}^2+Im\{Y_{vh}(f)\}^2} \qquad [10]$$

The frequency axis is evaluated such as:

$$f_{axis}(m) = \frac{S_{adc}}{N_{spr2}} * \left[\frac{m - N_{spr2} - 1}{2}\right]_{m=1,\ldots,Nspr2} \quad [11]$$

$$= [-f_{max}, \ldots, 0, \ldots, +f_{max}]$$

where, $S_{adc}$=Analog-to-digital converter sampling rate in Hertz;

$N_{spr2}$=A number of samples held in a buffer; and, m=Index number representing a discrete location on the frequency axis.

Equation [11] indicates that there are negative and positive frequencies in the spectrum with respect to zero frequency (DC component). Because the vibration signal is real-valued and the spectrum is symmetric with respect to zero (DC) frequency, only the positive frequency spectrum data may be used for any further analysis.

After evaluating $Y_{Vh\text{-}abs}$ (f), a number of parameters, which may be monitored for excessive vibration, may be determined. These parameters may include the spectral component at zero frequency (DC), average spectral energy within a band, and the maximum spectral peak within each band. The generation of bands will be more fully described hereinafter.

At step 506, the spectral component at zero frequency is generated and is equal to the area under the time domain vibration signal. The spectral component at zero frequency may be represented as:

$$Y_{Vh\text{-}abs}(f=0) = \int_{\infty}^{\infty} |\mu v_d(t)| dt \quad [12]$$

An excessive vibration will produce a large spectral component at zero frequency. It should be appreciated that this parameter is readily available after performing the Fast Fourier Transform of the vibration signal instead of actually integrating the signal. This parameter may be denoted as $V_{h\text{-}dc}(k)$, where (k) is the buffer location in the processing unit, and represents the area under the curve or the magnitude at zero frequency.

At step 508, the spectral component $V_{h\text{-}dc}(k)$ is compared to one or more thresholds ($T_{0z}$) to determine whether excessive vibration is occurring. At step 510, an alarm may be issued if excessive vibration is occurring. As will be more fully described with reference to FIG. 14, the processing unit 140 may perform an analysis of the alarm signal in an effort to reduce the occurrence of false alarms.

Continuing with reference to FIG. 12, at step 514, the spectrum is divided into $N_{bin}$ bands, where $N_{bin}$ is a power of 2 so that the spectrum can be equally divided linearly. FIG. 13 shows an example of a divided spectrum when the sampling rate ($S_{adc}$)=25,000 Hz, the number of bands ($N_{bin}$)=8, and the number of data points ($N_{spr2}$)=1,024. The average spectral energy and the maximum peak in each band are determined by the processing unit and are compared to separate thresholds. In this manner, the processing unit is able to detect whether a peak amplitude and vibration energy of certain frequencies are present, indicating a defect or potential defect of a component in the gearbox because each component may exhibit discrete vibrational characteristics at certain frequencies. Defects or potential defects of discrete components may be analyzed independently, without the influence of surrounding components. Otherwise, if the frequency spectrum is analyzed without being divided into bands, then the vibrational characteristics of discrete components may be dampened.

As will be further discussed hereinafter, the threshold within each band may be learned or set when the gearbox is placed in service, rather than being pre-set and stored in memory. This feature, together with the feature of dividing the spectrum into bands, allows for the detection of defects or potential defects exhibited by unknown or unpredicted frequencies (i.e., components not normally recognized as exhibiting a likelihood of experiencing defects or a combination of components or a combination of the gearbox and surrounding equipment producing unknown or unpredicted frequencies). That is, if the spectrum is filtered, as may be the case in some conventional monitoring systems, only predicted frequencies remain. Thus, a particular frequency of a certain component in combination with other components or surrounding equipment which may lie outside the predicted frequency, is not recognized and therefore is not analyzed.

At step 516, a parameter representing the average spectral energy in each band is generated using, for example, the following equation:

$$V_{erg\text{-}sb}(k, l) = \frac{1}{N_{sb}} * \sum_{i=(l-1)*N_{sb}+1}^{l+N_{sb}} [Y_{Vh\text{-}abs}(i)]^2, l = 1, \ldots, N_{bin} \quad [13]$$

where, $N_{sb}=N_{spr2}/N_{bin}$ $V_{erg\text{-}sb}$ (k,l)=the average energy in the $l^{th}$ band in the $k^{th}$ buffer signal.

At step 518, the average spectral energy ($V_{erg\text{-}sb}$ (k,l)) in each band is compared to one or more thresholds ($T_{ergZ,Nbin}$). A certain level of alarm (i.e. NORMAL, CAUTION, or WARNING, etc.) may be issued, depending upon which of the one or more thresholds are exceeded or crossed. Alternatively, as shown in steps 520–522, a second tier of comparisons may be made before issuing an alarm. In this example, at step 520, a value is assigned for each threshold crossing. If a first threshold is crossed, then a first value may be assigned to that threshold crossing; if a second threshold is crossed, then a second value may be assigned, and so on, depending upon the number of thresholds used. The numeric values for each band are summed together. At step 522, the summed values are then compared to energy thresholds ($T_{eZ}$). Depending upon which threshold ($T_{eZ}$) is exceeded, a corresponding level of alarm (i.e. NORMAL, CAUTION, or WARNING, etc.) may be indicated. Alternatively, as will be more fully described with reference to FIG. 14, the processing unit 140 may perform an analysis on the alarm signal in an effort to reduce the occurrence of false alarms.

For example, assume there are three threshold levels for each band and there are four bands. A crossing of the first threshold $T_{erg1,N}$ may have a value of 0, a crossing of the second threshold $T_{erg2,N}$ may have a value of 0.5 and the crossing of a third threshold $T_{erg3,N}$ may have a value of 1. Assume that the average spectral energy ($V_{erg\text{-}sb}$ (k,1)) for the first band has crossed the second threshold $T_{erg2}$, resulting in a numeric value 0.5, the average spectral energy ($V_{erg\text{-}sb}$ (k,2)) for the second band has crossed the third threshold, resulting in a numeric value of 1, the average spectral energy ($V_{erg\text{-}sb}$ (k,3)) for the third band has also crossed the third threshold, resulting in a numeric value of 1, and the average spectral energy ($V_{erg\text{-}sb}$ (k,4)) for the fourth band has crossed the first threshold, resulting in a numeric value of 0 then the summed value is 2.5. This summed value is compared to an energy threshold ($T_{eZ}$). Depending upon which threshold ($T_{eZ}$) is exceeded, a corresponding level of alarm may be indicated. Thus, in this example, assuming a value of 0 is NORMAL, a value of 2 is CAUTION and a value of 4 is WARNING, then the processing unit 140 may indicate a CAUTION, even though, during the first level of comparisons, a higher level (i.e WARNING) may have been indicated. This second level of comparisons may be used to provide an alarm for each parameter, which may be passed to a Diagnostic/Advisory/Decision (D/A/D) system, as will be explained hereinafter.

Continuing with reference to FIG. 12, at step 528, a parameter representing the spectral peak in each band is generated using, for example, the following equation:

$$V_{p\text{-}sb}(k,l) = \max\{Y_{Vh\text{-}abs}(i)\}, i=(l-1)*N_{sb}+1, \ldots, l*N_{sb}; l=1, \ldots, N_{bin} \quad [14]$$

where, $N_{sb} = N_{spr2}/N_{bin}$ $V_{p\text{-}sb}(k,l)$=the peak spectrum in the $l^{th}$ band in the $k^{th}$ buffer signal.

As discussed above with reference to steps 518–526, the peak spectrum is compared to a first level threshold and may be compared to a second level threshold. Thus, at step 530, the spectral peak ($V_{p\_sb}(k,l)$) in each band is compared to one or more thresholds ($T_{peakZ,Nbin}$). A certain level of alarm (i.e. NORMAL, CAUTION, or WARNING, etc.) may be issued depending upon which of the one or more thresholds are exceeded or crossed.

As mentioned, a second tier of comparisons may be made before issuing an alarm. Thus, at step 532, a value is assigned for each threshold crossing. If a first threshold is crossed, then a first value may be assigned to that threshold crossing; if a second threshold is crossed, then a second value may be assigned, and so on, depending upon the number of thresholds used. The numeric values for each band are summed together. At step 534, the summed values are then compared to peak thresholds ($T_{pZ}$). Depending upon which threshold ($T_{pZ}$) is exceeded, a corresponding level of alarm (i.e. NORMAL, CAUTION, or WARNING, etc.) may be indicated at step 536. Alternatively, as will be more fully described with reference to FIG. 14, the processing unit 140 may perform an analysis on the alarm signal in an effort to reduce the occurrence of false alarms.

The peak vibration from the time domain and the overall energy from the time domain may also be analyzed at steps 540 and 542, respectively. The peak vibration and the overall energy may then be compared to a threshold by a comparing each to a threshold at steps 544 and 546, respectively. Based on the comparison, alarms may be indicated at steps 548 and 550, respectively. As above, the alarms generated may be analyzed respectively, in a false alarm routine.

The above vibration analysis may also be useful in detecting damaging levels of vibrations surrounding the working site of the gearbox.

In alternative embodiment, the processing unit 140 may provide the individual alarms from the comparisons of the spectral component at zero frequency, the average spectral energy in each band, the maximum spectral peak, the peak vibration in the time domain and the overall energy in the time domain is indicated, to the D/A/D system, as shown at step 560. These alarms may be used as input variables to the D/A/D system, which comprises an expert system, for further analysis. The D/A/D system may be used for diagnostic and advisory information for the operator.

The processing unit 140 may be programmed with a set of instructions for limiting the occurrence of false alarms. This may be accomplished, for example, by performing a third tier analysis, such as, for example, averaging the alarm levels (i.e. averaging the number of occurrences of NORMAL, CAUTION, or WARNING, etc.). In addition, the average alarm levels for each parameter (spectral component at zero frequency, average spectral energy in each band, spectral peak in each band, peak vibration, and overall energy) may be added together and compared to one or more threshold values to obtain a global alarm indicative of the overall condition of the gearbox, as shown in FIG. 14. Once the alarms for the individual parameters have been determined, at step 600, numeric values are assigned to each alarm level. For example, NORMAL, CAUTION, and WARNING may be indicated with values of, for example, 0, 0.5, and 1, respectively. Next, at step 602, averages of a plurality (X) of numeric values are determined. At step 604, these averages for each parameter are multiplied by a weighting factor and summed together. At step 606, the summed value is compared to one or more global thresholds ($T_{gZ}$). If the summed value exceeds the threshold, then a global alarm may be indicated at step 608. Of course, it is to be appreciated that the false alarm rate may be adjusted by adjusting the number (X) of the numeric values used in step 602, while maximizing detection probability of a true alarm. In addition, or in the alternative, the global thresholds ($T_{gZ}$) may be adjusted to adjust the false alarm rate.

As discussed in connection with step 560 of FIG. 12, in an alternative embodiment, the processing unit 140 may provide the averaged alarm values from step 602 to the D/A/D, shown at step 618.

Figure 15:
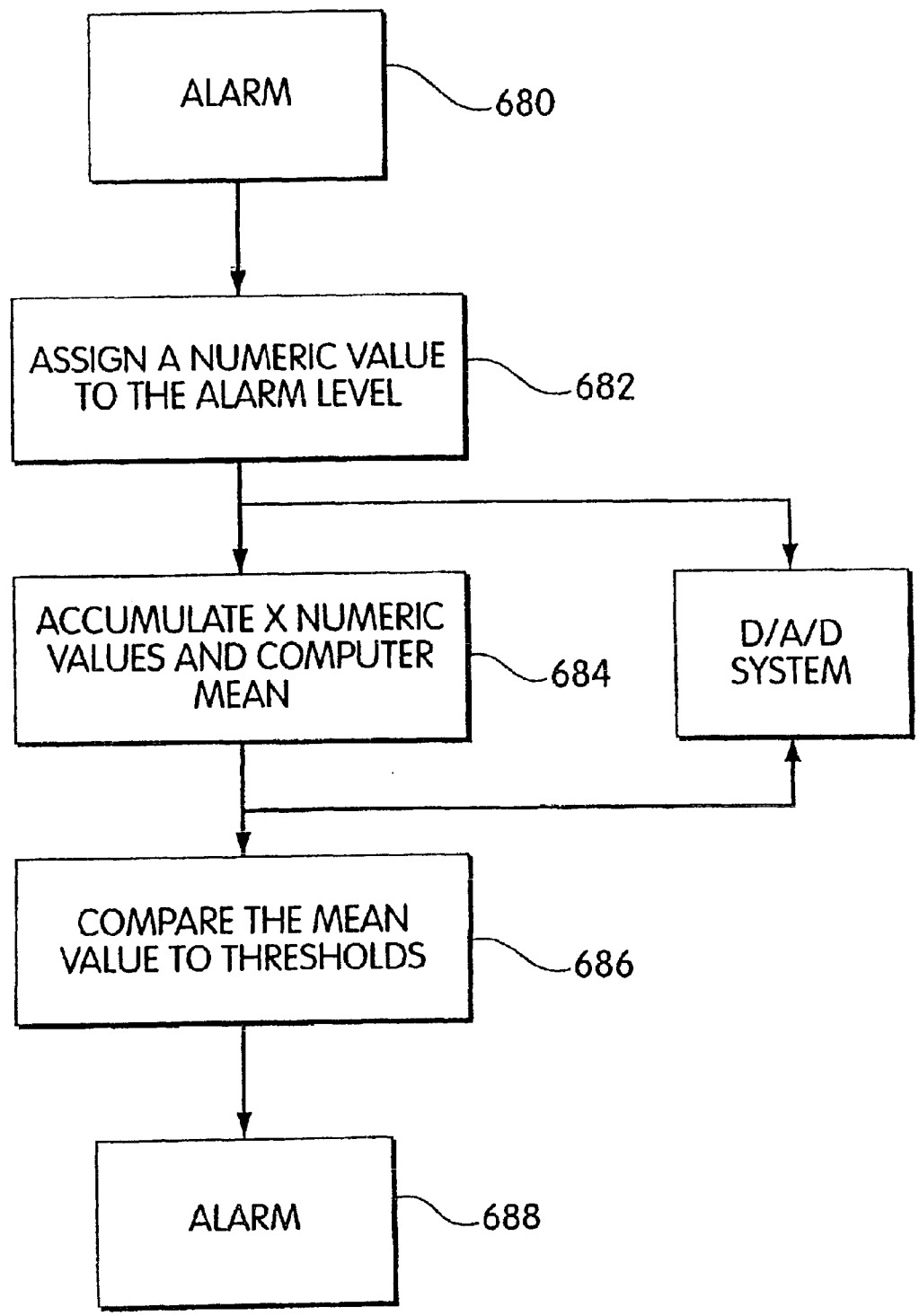
FIG. 15 is a flow chart showing an example of false alarm control for other sensed parameters.

A similar false alarm control scheme may be used for reducing false alarms from the pressure sensor, the temperature sensor or any other sensors which may be used, while maximizing detection probability of a true alarm. Such a scheme may include determining a weighted average of the indicated alarm levels prior to issuing an alarm, as above. As best shown in FIG. 15, after the alarms for the individual parameters have been determined at step 680, then, at step 682, numeric values are assigned to each alarm level. For example, NORMAL, CAUTION, and WARNING may be indicated with values of, for example, 0, 0.5, and 1, respectively. Next, at step 684, an average of a plurality (X) of numeric values is determined. At step 686, the average is compared to one or more thresholds. At step 688, the indicated alarm level NORMAL, CAUTION, or WARNING may be indicated. The false alarm rate may be adjusted by adjusting the number (X) of the numeric values used in step 684. In addition, or in the alternative, the thresholds may be adjusted to adjust the false alarm rate. The processing unit 140 may provide the averaged alarm value from step 682 and/or step 684 to the D/A/D.

Figure 16:
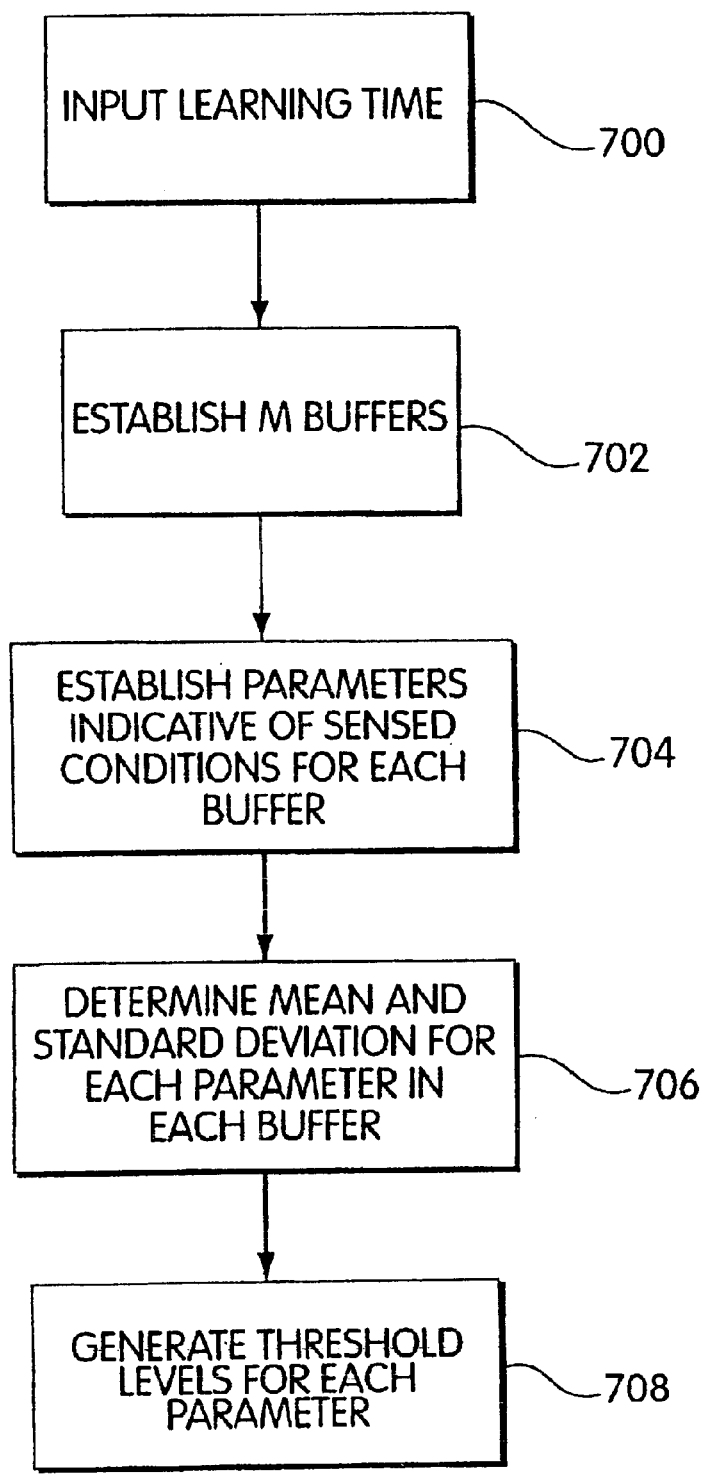
FIG. 16 is a flow chart showing an example of threshold setting analysis.

According to another aspect of the invention, it may be desirable to set the any or all of the above mentioned thresholds when the gearbox is placed in its working environment rather than pre-setting the threshold levels during manufacture of the gearbox. Thus, the operating environment surrounding the working site the of the gearbox may be taken into account. As shown in FIG. 16, the thresholds may be learned by the processing unit 140. In this example, at step 700, a learning time ($t_L$) may be provided by the user or a predetermined learning time may be stored in the memory of the processing unit. During the learning time ($t_L$), the sensed conditions ($\mu$) are accumulated in the memory. At step 702, one or more buffers (M) are provided. At step 704, M values of the following seven parameters are established: $\mu_{T\_oil}(k)$, $\mu_{P\_oil}(k)$, $V_{h\text{-}peak}(k)$, $V_{h\text{-}erg}(k)$, $V_{h\text{-}dc}(k)$, $V_{erg\text{-}sb}(k,l)$, and $V_{p\text{-}sb}(k,l)$, where k=1 through M. In the example described herein, the first four parameters are produced from the pre-processing of the time signals from the temperature, pressure, and vibration sensors and the other three parameters are generated from the vibration analysis using the vibration signal only. Of course, other parameters values may be acquired, depending upon other sensors that may be added to or substituted into the monitoring system. To determine the thresholds, at step 706, the mean (m) and standard deviation (S) of each of these parameters are evaluated using, for example, the following equations:

$$m_{T-oil} = \frac{1}{k}\sum_{i=1}^{k} \mu_{T-oil}(i); \qquad [15]$$

$$\text{and, } S_{T-oil} = \left[\frac{1}{k}\sum_{i=1}^{k} \{\mu_{T-oil}(i) - m_{T-oil}\}^2\right]^{\frac{1}{2}} \qquad [16]$$

$$m_{P-oil} = \frac{1}{k}\sum_{i=1}^{k} \mu_{P-oil}(i); \qquad [17]$$

$$\text{and, } S_{P-oil} = \left[\frac{1}{k}\sum_{i=1}^{k} \{\mu_{P-oil}(i) - m_{P-oil}\}^2\right]^{\frac{1}{2}} \qquad [18]$$

$$m_{Vh-peak} = \frac{1}{k}\sum_{i=1}^{k} V_{h-peak}(i); \qquad [19]$$

$$\text{and, } S_{Vh-peak} = \left[\frac{1}{k}\sum_{i=1}^{k} \{V_{h-peak}(i) - m_{Vh-peak}\}^2\right]^{\frac{1}{2}} \qquad [20]$$

$$m_{Vh-erg} = \frac{1}{k}\sum_{i=1}^{k} V_{h-erg}(i); \qquad [21]$$

$$\text{and, } S_{Vh-erg} = \left[\frac{1}{k}\sum_{i=1}^{k} \{V_{h-erg}(i) - m_{Vh-erg}\}^2\right]^{\frac{1}{2}} \qquad [22]$$

$$m_{Vh-dc} = \frac{1}{k}\sum_{i=1}^{k} V_{h-dc}(i); \qquad [23]$$

$$\text{and, } S_{Vh-dc} = \left[\frac{1}{k}\sum_{i=1}^{k} \{V_{h-dc}(i) - m_{Vh-dc}\}^2\right]^{\frac{1}{2}} \qquad [24]$$

$$m_{erg-sb}(l) = \frac{1}{k}\sum_{i=1}^{k} V_{erg-sb}(i,l); \qquad [25]$$

$$\text{and, } S_{erg-sb}(l) = \left[\frac{1}{k}\sum_{i=1}^{k} \{V_{erg-sb}(i,l) - m_{erg-sb}(l)\}^2\right]^{\frac{1}{2}} \qquad [26]$$

$$m_{vp-sb}(l) = \frac{1}{k}\sum_{i=1}^{k} V_{p-sb}(i,l); \qquad [27]$$

$$\text{and, } S_{vp-sb}(l) = \left[\frac{1}{k}\sum_{i=1}^{k} \{V_{p-sb}(i,l) - m_{vp-sb}(l)\}^2\right]^{\frac{1}{2}} \qquad [28]$$

where l=1, . . . , $N_{bin}$, $_{T-oil}$ and $_{P-oil}$ (as subscripts) represent a value relating to the temperature of the oil and the pressure of the oil, respectively. The thresholds for the alarms are computed at step 708 using, for example, the following equations:

$$t(n) = m + n*S \qquad [29]$$

where,
t=the learned thresholds and,
n=threshold number.

Figure 17:
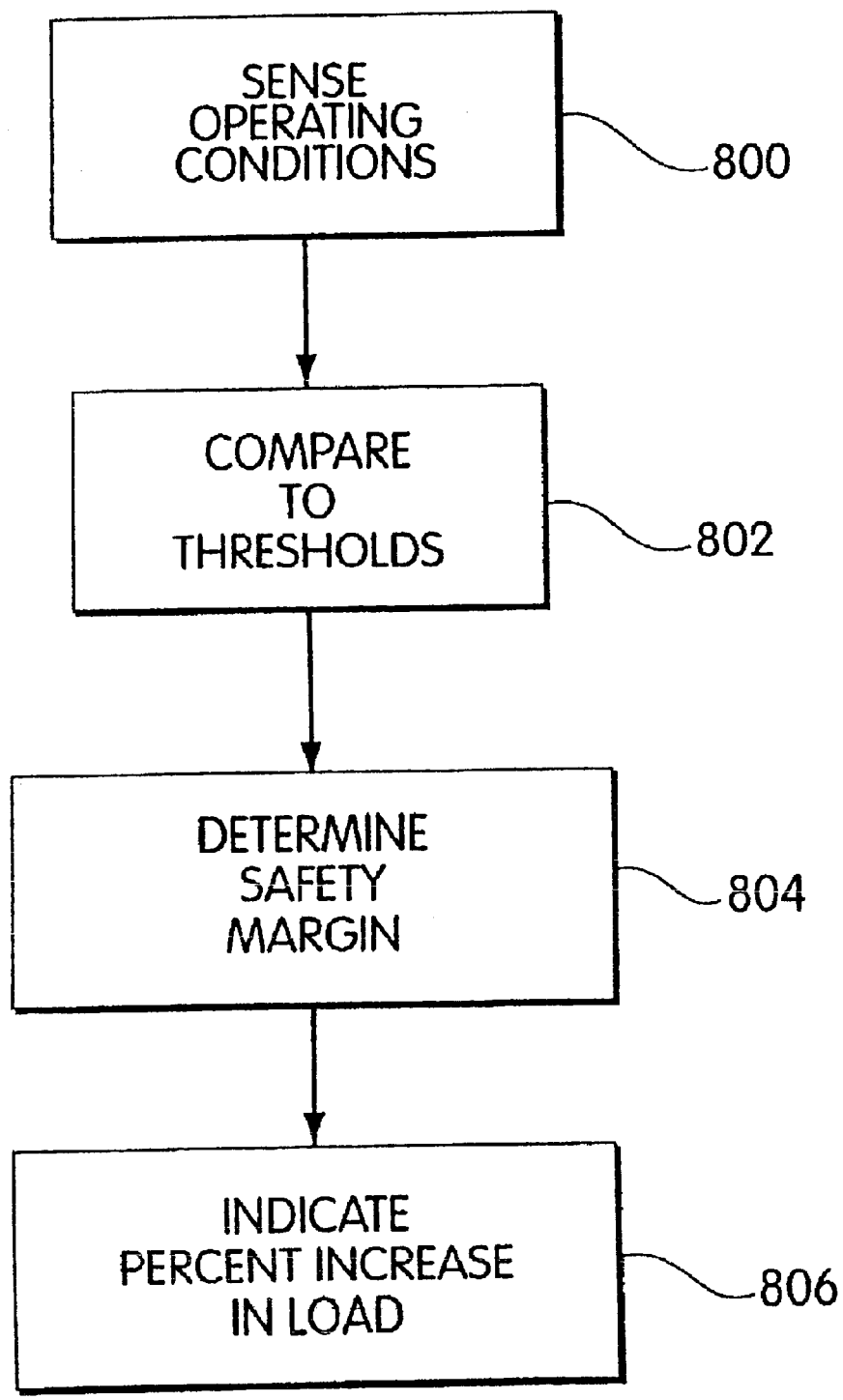
FIG. 17 is a flow chart showing an example of operating margin analysis.

According to another aspect of the invention, the monitoring system 100 may also be used to determine whether the gearbox may be operated closer to its physical operating limit, thereby handling more power or speed without the need to modify the physical design. Referring specifically to FIG. 17, at step 800, the operating conditions of the gearbox (such as temperature, pressure, or vibration) are sensed by the monitoring system as described above, although other conditions may be sensed as desired. Next, at step 802, the sensed operating conditions are compared to threshold values, also as described above. In this manner, the thresholds may define the physical operating limits of the gearbox. At step 804, the processing unit determines the margin of safety between the sensed values and the thresholds. This margin indicates the amount of increase in load that the gearbox may experience before the thresholds are exceeded. Thus, at step 806, the processing unit indicates a percentage increase in load to an operator, which corresponds to the margin. An operator may then increase the load by the indicated percentage, which has the effect of reducing the margin. Alternatively, the processing unit may communicate with a controller on the machine that is coupled to the gearbox. The processing unit may then signal the machine controller to modify its output to the gearbox accordingly.

According to another aspect of the invention, torque estimation may be performed by determining the number of discrete samples representing a rotation of a rotating member of the gearbox, such as the input shaft, and comparing the number of discrete samples to stored data representative of the number of discrete samples as a function of torque, as will be described. A percent change in the number of discrete samples indicates a corresponding percent change in torque. The number of discrete samples may be determined through the use of one or more conventional sensors and a relationship between the number of discrete samples and torque may be obtained through experimentation. As shown in FIG. 1, an example of such a sensor may be a Hall effect transducer 900 communicating with a toothed ring (not shown) or a notch (not shown) on the input shaft.

Figure 18:
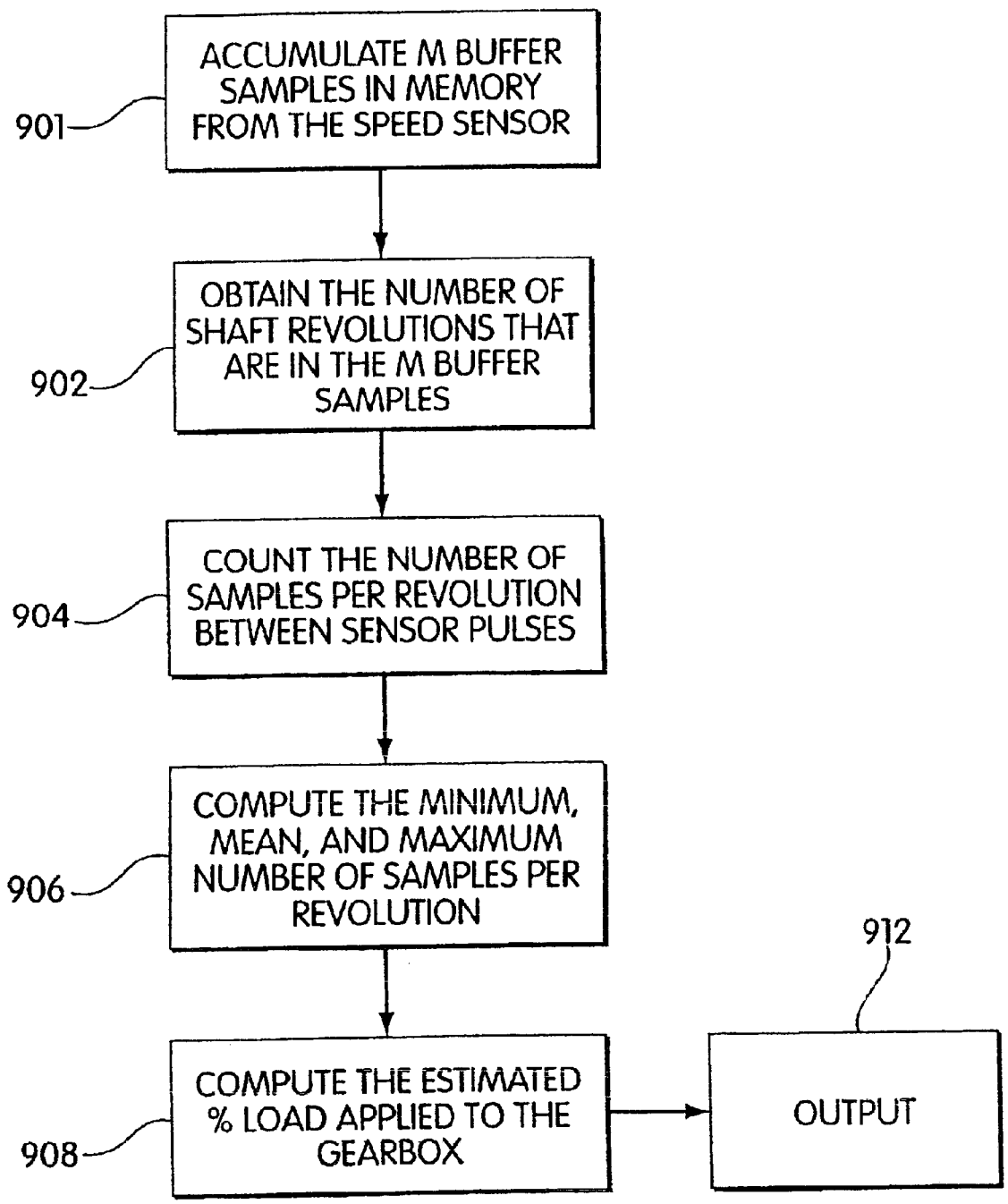
FIG. 18 is a flow chart showing an example of torque estimation.
Figure 19:
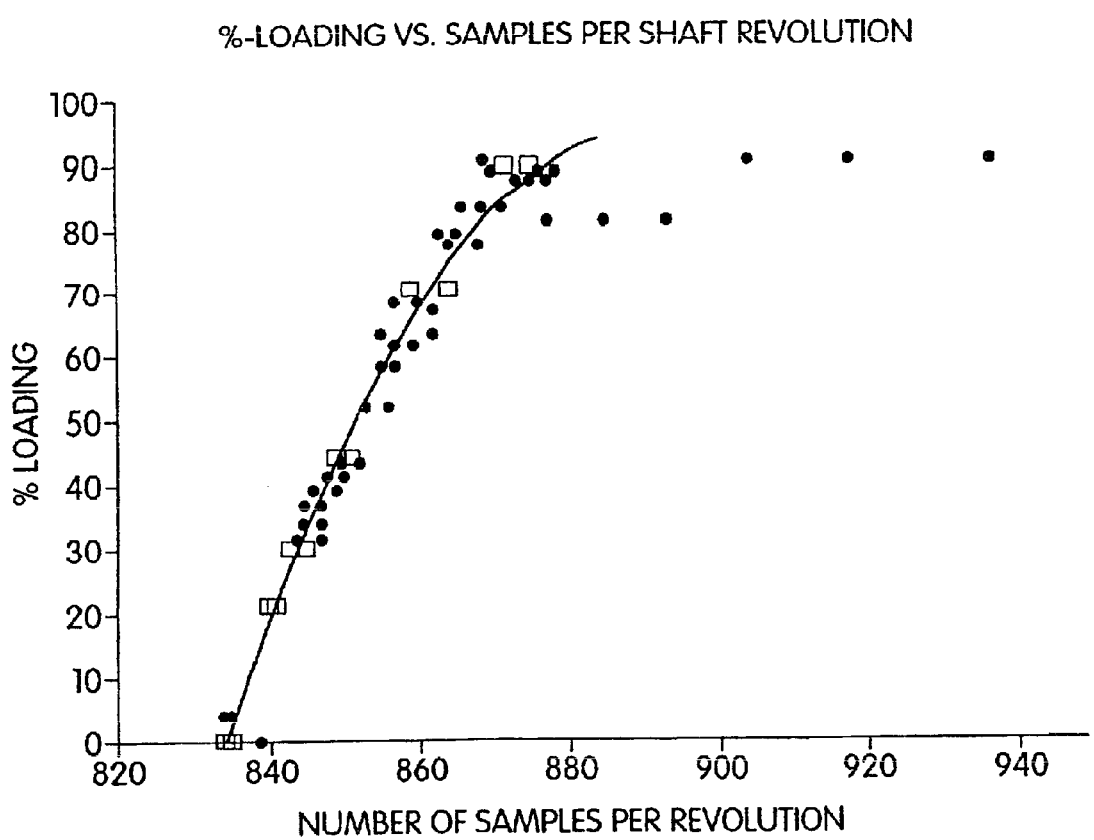
FIG. 19 is a sample curve showing a relationship between a number of discrete samples per revolution and torque; and, FIG. 20 is a flow chart showing an example of active gearbox control.

FIG. 18 shows an example of a method performed by the processing unit according to this aspect of the invention. In this example, the number of discrete samples representing a shaft rotation is determined by analyzing the samples generated by the analog-to-digital converter on the sensor. It is to be appreciated that the analog-to-digital converter samples the sensor at a predetermined sampling frequency. At step 901, a number (M) of buffer samples from the sensor 900 is accumulated in memory. Next, at step 902, the number of revolutions that are in the M buffer samples is obtained, and at step 904, the number of samples per revolution of the sensor performed by the analog-to-digital converter (i.e the number of samples occurring between complete revolutions) is accumulated. This may be accomplished because the number of samples performed by the analog-to-digital converter between complete revolutions of the shaft is greater than the rate at which the sensor indicates a complete revolution. Thus, the higher the number of samples between revolutions, the slower the frequency of rotation. At step 906, the minimum ($N_{min}$), mean ($N_{mean}$) and maximum ($N_{max}$) number of samples per revolution are computed. At step 908, an estimated torque that is applied to the gearbox is computed. This may be accomplished by using a look-up table or curve or a suitable functional relationship stored in memory that relates the number of samples per revolution to torque. Torque data as a function of the number of samples per revolution may be determined by experimentation of a test gearbox. An example of such a relationship is shown in FIG. 19. Rather than using a look-up table, a suitable function may be derived from the experimental data using, for example, curve fitting techniques, such as the least squares method or non-linear data-fitting methods.

An example of such a functional relationship is:

$$\%L=C_1N^2+C_2N+C_3 \quad [30]$$

where, $C_1$, $C_2$ and $C_3$ are constants;

N=Number of samples per revolution, which may be $N_{min}$, $N_{mean}$, $N_{max}$; and, % L=Estimated percent load or torque.

The estimated torque applied to the shaft may be determined to be approximately equal to the torque derived from the mean number of samples per revolution ($N_{mean}$), bounded by a maximum and a minimum torque, derived from the maximum and minimum number of samples per revolution ($N_{max}$, $N_{min}$), respectively. At step 912, estimated torque as a percent load may be output to the indicator 149 (see FIG. 1), or used or displayed in any desired manner. Preferably, the computation described with reference to FIG. 18 is repeated during the operation of the gearbox.

If the percent load estimated by one of the methods described above is a torque applied to a motor that is coupled to and drives a gearbox, the percent load (or torque) applied to the gearbox output shaft can also be estimated. The torque applied to the gearbox output shaft is directly proportional to that applied to the motor shaft. The torque applied to the motor shaft ($\%L_{motor\ shaft}$) is less than the torque applied to the output shaft of the gearbox ($\%L_{gearbox\ output\ shaft}$). This relationship holds because of the efficiency of the gearbox ($\eta_{gearbox}$). This efficiency may be obtained from the gearbox manufacturer, a look-up table of efficiency as a function of speed, or other suitable parameters relating to the motor and/or the gearbox. The torque applied to the output shaft of the gearbox may be determined by:

$$\%L_{gearbox\ output\ shaft}=\%L_{motor\ shaft}*\eta_{gearbox} \quad [31]$$

Alternatively the torque applied to the output shaft of the gearbox may be determined by the following equation:

$$\%L_{gearbox\ output\ shaft}=\%L_{motor\ shaft}-(1-\eta_{gearbox}) \quad [32]$$

According to another aspect of the present invention, the gearbox may be actively controlled to increase performance and efficiency, without the need to replace the gearbox with a gearbox designed specifically for the increased demand.

Figure 20:
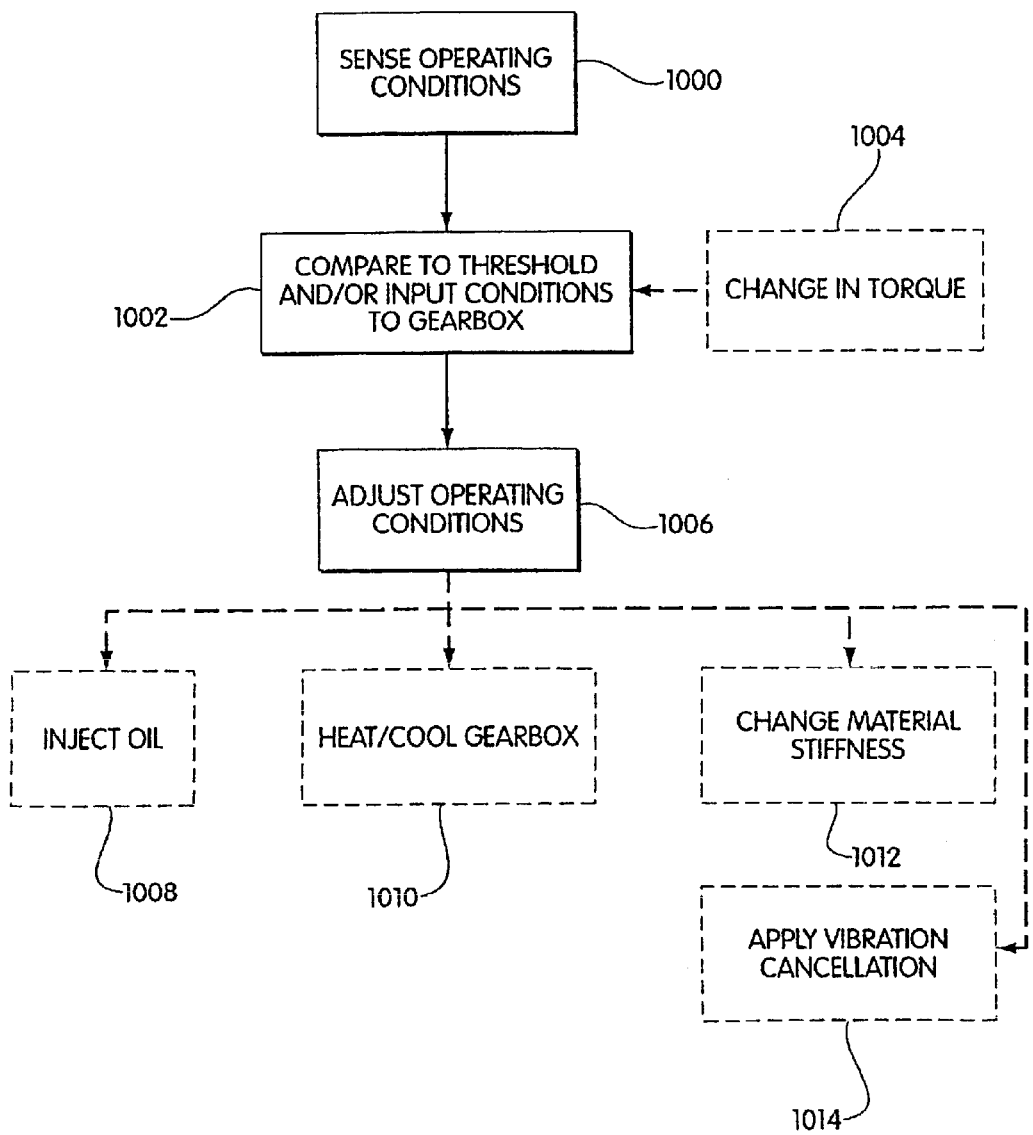

In a preferred embodiment, this may be accomplished by the method described with reference to FIG. 20. At step 1000, the operating conditions of the gearbox are sensed using, for example, the sensors and methodology described above. The sensed conditions, at step 1002, are compared to the threshold values also, as described above. In addition, or in the alternative, the sensed operating conditions may be compared to external conditions to the gearbox. Such external conditions may be the torque applied to the input shaft of the gearbox, as shown at step 1004. If the threshold values or the external conditions to the gearbox are exceeded, then, at step 1006, the processing unit sends signals to various actuators to adjust certain operating characteristics of the gearbox. Examples of such adjustments are discussed with reference to steps 1008, 1010, 1012, and 1014.

At step 1008, the gearbox may include an oil injector 1020 positioned either in an additional oil drain plug or in a separate opening formed in the case of the gearbox (as shown in FIG. 1) and communicating with the processing unit. The oil injector may be adapted to inject oil onto the gear mesh or onto any suitable rotating member within the gearbox. In addition, the oil injector may simply be used to increase the oil level within the gearbox. Of course, one or more oil injectors may be used. Thus, according to this aspect of the invention, if the oil level, as sensed in step 1000, is below a threshold value, as compared in step 1002, then, at step 1008, the processing unit may send a signal to the oil injector to inject additional oil into selected areas within the gearbox.

Another example of adjusting operating characteristics within the gearbox is shown at step 1010. In this step, the gearbox may be cooled so as to lower the operating temperature to within the limits established by the threshold. Examples of gearbox cooling include, but are not limited to, spraying cooling liquid onto the gearbox itself, operating a cooling fan to provide air cooling over the gearbox or fitting the gearbox with liquid channels formed in the case and connecting the channels to a suitable climate control unit. The gearbox may also be heated if the operating temperature is not operating above a threshold. Accordingly, warm air may be moved over the gearbox, or the gearbox may be fitted with an electrical heater. Also, warm liquid may flow through the channels formed in the gearbox case.

In some instances, the input torque to the gearbox may change, which may require an adjustment to the gearbox to accommodate the increased strength requirements. Accordingly, as shown at step 1012, material properties, such as the stiffness, of the gearbox components may be varied using suitable material property adjusting techniques now known or later developed. Examples of such techniques include using adaptive or intelligent materials, such as materials having fibers embedded therein which are responsive to electric fields applied thereto. Other methods may include piezoelectric or magnetorheological techniques. Such an adjustment to the material properties may avoid shock damage or smooth out mechanical power transfer through the gearbox.

If the sensed operating condition is vibration, and the vibration exceeds a threshold, then, at step 1014, vibration or noise cancellation techniques may be applied to the gearbox such that the detrimental vibration may be canceled.

Other suitable methods may be used to control the operating characteristics of the gearbox to improve the performance or efficiency thereof.

While the best mode for carrying out the invention has been described in detail, those skilled in the art to which this invention relates will recognize various alternative embodiments including those mentioned above as defined by the following claims.

What is claimed is:

1. A method of estimating torque applied to a rotating component of a production gearbox, the method comprising the steps of:

provided empirical data relating torque to a number of sample readings between complete revolutions of a rotating component of a test gearbox;

counting a number of sample readings between complete revolutions of a rotating component of the production gearbox;

comparing the counted number of sample readings of the rotating component of the production gearbox to the number of sample readings between complete revolutions of the rotating component of the test gearbox contained in said empirical data; and estimating torque applied to the rotating component of the production gearbox based on said comparison.

2. A method according to claim 1 further comprising the steps of:

providing an analog-to-digital converter communicating with a sensor; and sampling said sensor with said analog-to-digital converter to generate said number of sample readings.

3. A method according to claim 1 further comprising the step of:

calculating a minimum, maximum and mean number of sample readings between complete revolutions;

wherein said step of estimating torque is also based at least in part on said mean number of sample readings between complete revolutions.

4. A method according to claim 1 wherein said estimating step further comprises calculating a torque of another rotating component by comparing the first torque to an efficiency of the gearbox.

5. A method according to claim 4 wherein said rotating component is an input shaft and said another rotating component is an output shaft.

6. A method according to claim 1 wherein said rotating component is an input shaft.

7. A method according to claim 1 further comprising the step of calculating a percent change in torque based on a percent change in said number of sample readings between complete revolutions of the rotating component.

* * * * *